United States Patent [19]
Fantone

[11] Patent Number: 5,769,227
[45] Date of Patent: Jun. 23, 1998

[54] BOX CONTAINER SYSTEMS AND DISPLAY FRAMES WITH TWO-DIMENSIONAL MULTIPLE VIEW OPTICS

[75] Inventor: Stephen D. Fantone, Lynnfield, Mass.

[73] Assignee: Insight, Inc., Lynnfield, Mass.

[21] Appl. No.: 772,968

[22] Filed: Dec. 23, 1996

Related U.S. Application Data

[63] Continuation-in-part of Ser. No. 222,632, Apr. 1, 1994, abandoned, Ser. No. 338,246, Nov. 14, 1994, Pat. No. 5,588,526, and Ser. No. 508,380, Jul. 31, 1995.

[51] Int. Cl.[6] ................................................... B65D 85/00
[52] U.S. Cl. ........................................ 206/459.1; 206/232
[58] Field of Search ...................................... 206/232, 307, 206/308.1, 309, 310, 311, 312, 387.1, 387.14, 459.5, 459.1; 40/436, 453, 454

[56] References Cited

U.S. PATENT DOCUMENTS

| | | |
|---|---|---|
| 1,220,515 | 3/1917 | Kantro . |
| 2,507,975 | 5/1950 | Hotchner .................................. 40/436 |
| 2,589,735 | 3/1952 | Salfisberg . |
| 2,833,176 | 5/1958 | Ossoinak .................................. 40/454 |
| 2,915,843 | 12/1959 | Pabst et al. .............................. 40/454 |
| 3,076,541 | 2/1963 | Volckening . |
| 3,953,869 | 4/1976 | Lo et al. . |
| 3,973,958 | 8/1976 | Bean . |
| 4,004,889 | 1/1977 | Orentreich et al. . |
| 4,120,562 | 10/1978 | Lo et al. . |
| 4,158,502 | 6/1979 | Smith et al. . |
| 4,225,380 | 9/1980 | Bjorkland . |
| 4,600,297 | 7/1986 | Winnek . |
| 4,606,556 | 8/1986 | Nickerson . |
| 4,650,282 | 3/1987 | Lo . |
| 4,783,133 | 11/1988 | Chen . |
| 4,863,026 | 9/1989 | Perkowski . |
| 4,869,946 | 9/1989 | Clay . |
| 4,895,252 | 1/1990 | Nomula . |
| 4,903,069 | 2/1990 | Lam . |
| 4,935,335 | 6/1990 | Fotland . |
| 5,101,971 | 4/1992 | Grobecker . |
| 5,133,213 | 7/1992 | Sandor et al. . |
| 5,189,531 | 2/1993 | Palmer et al. . |
| 5,244,084 | 9/1993 | Chan . |
| 5,276,478 | 1/1994 | Morton . |
| 5,279,912 | 1/1994 | Telfer et al. . |
| 5,364,274 | 11/1994 | Sekiguchi ................................. 40/436 |
| 5,494,445 | 2/1996 | Sekiguchi et al. . |
| 5,544,741 | 8/1996 | Fantone et al. ....................... 206/459.5 |
| 5,588,526 | 12/1996 | Fantone et al. . |

FOREIGN PATENT DOCUMENTS 2 222 143   2/1990   United Kingdom .

Primary Examiner—David T. Fidei
Attorney, Agent, or Firm—Francis J. Caufield

[57] ABSTRACT

Optical arrangements are provided by which observers of containers or display boxes, such as compact disc (CD) jewel boxes, are presented with different information when looking at a box's surfaces from different azimuthal and elevational angular perspectives. Advantageously, parallax effects are compensated where the size of the observable images and the viewing distance create undesirable visual artifacts. Lenticulated panels carrying arrays of lenslets are used in combination with interlaced images to convey the differently coded views without the need for physically manipulating such boxes as in the past to see equivalent information. Printed informational inserts are provided as printed inserts with interlaced images and reference surfaces for alignment, which is achieved either with control of fit or via resiliently flexible arrangements for urging the inserts into positions of proper alignment. These arrangements enhance the possibilities for displaying more and different kinds of information on a given box or display surface area and are useful for enhancing the prospects for increasing sales of products and displaying sporting figures, celebrities, animation, graphics, textual messages, stereo, special visual effects, or the like.

71 Claims, 19 Drawing Sheets

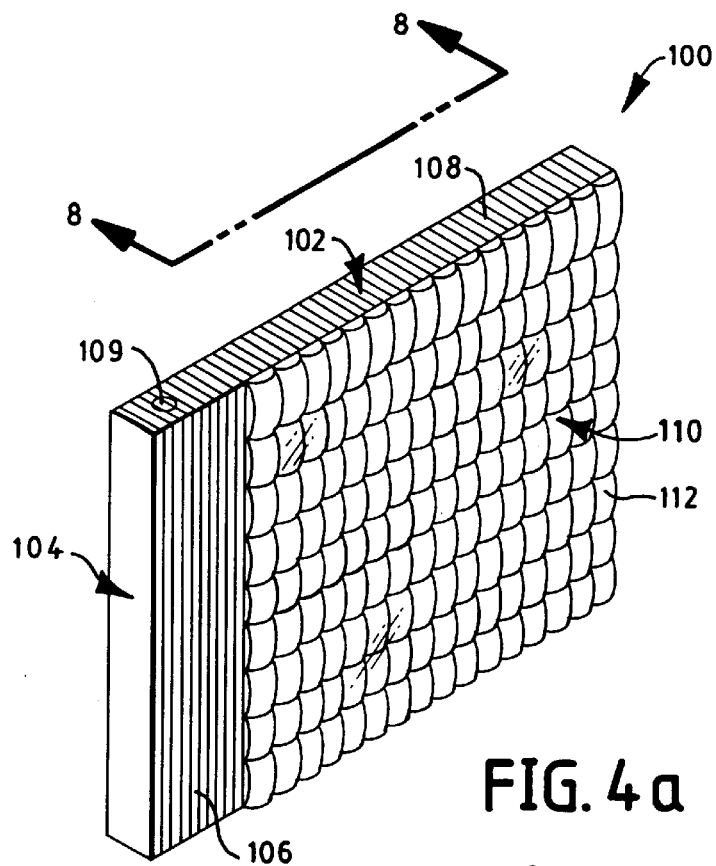
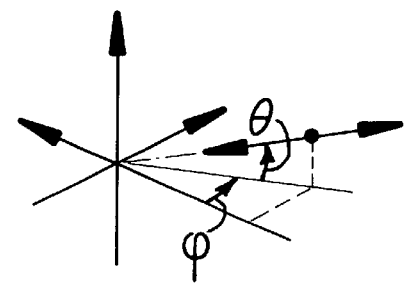
FIG. 4b
FIG. 4a
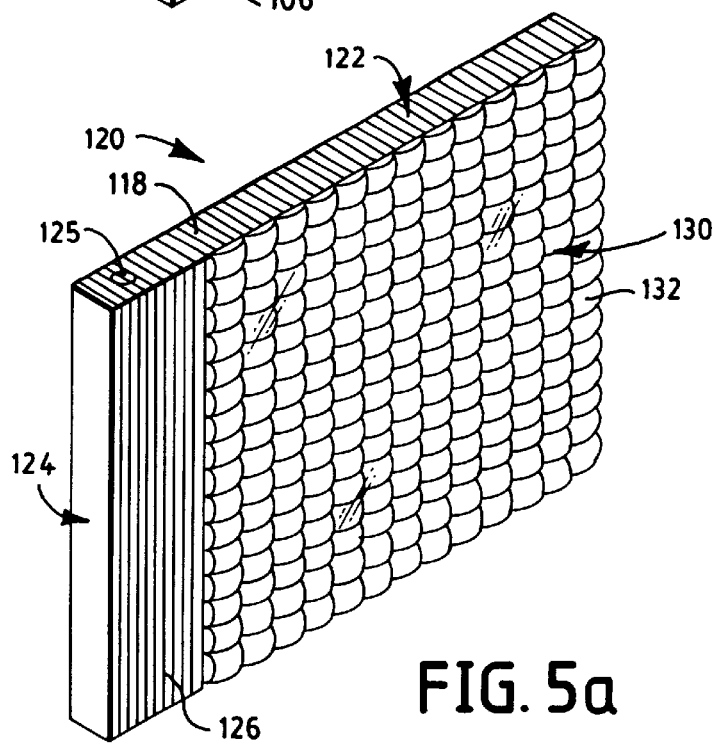
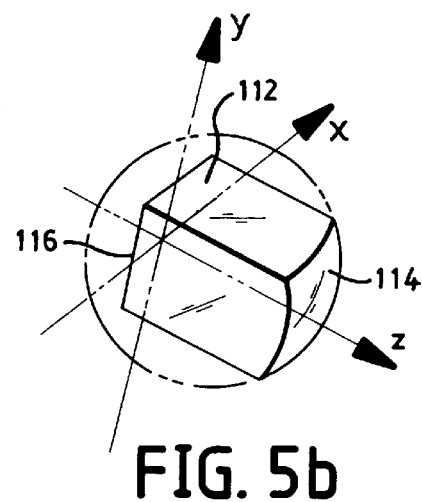
FIG. 5b
FIG. 5a

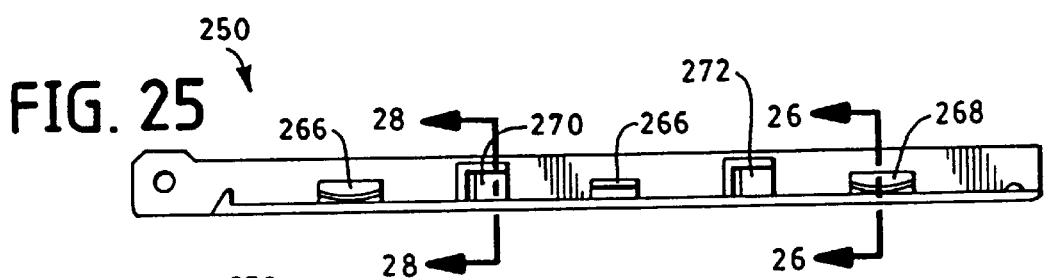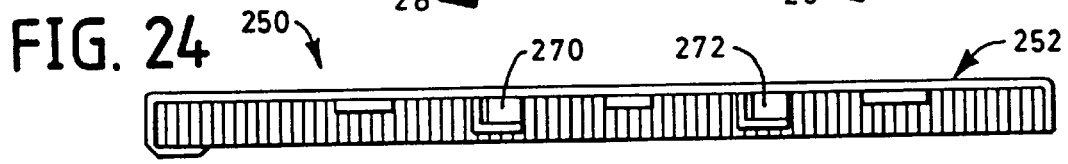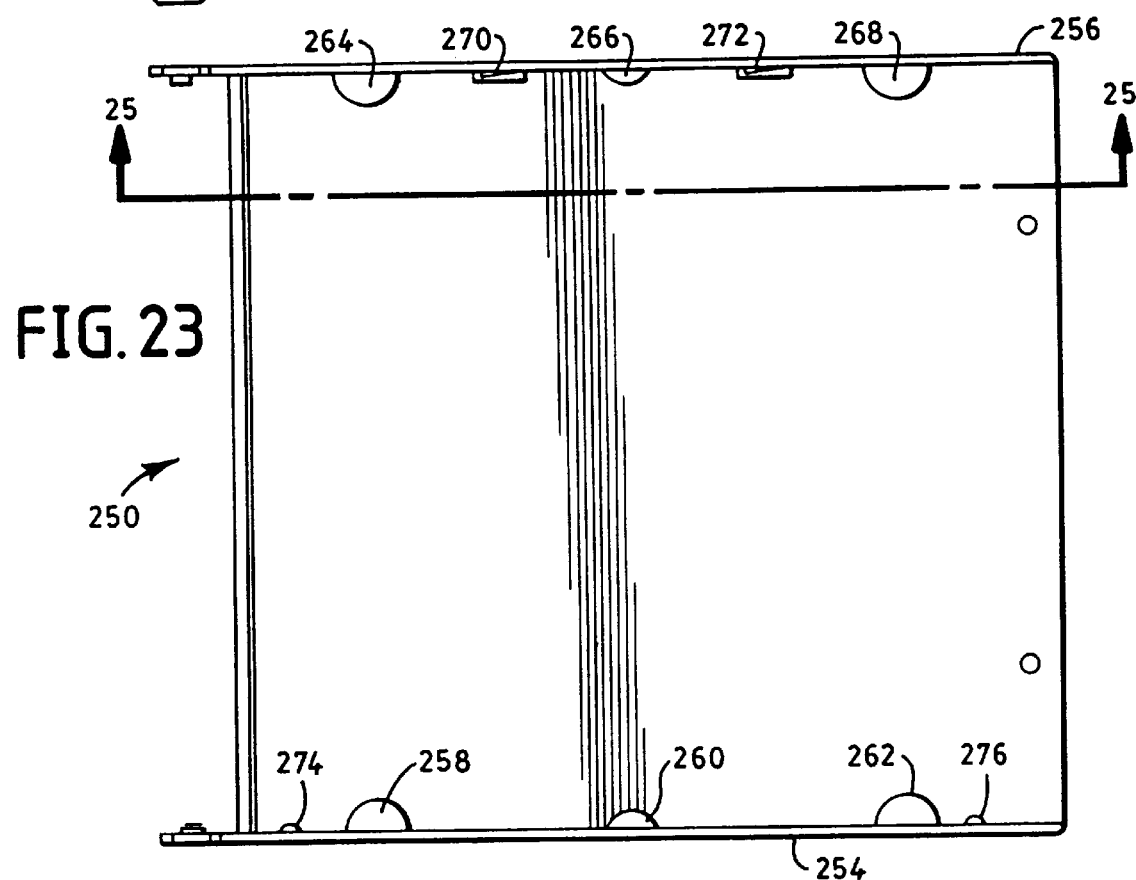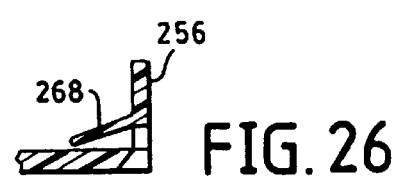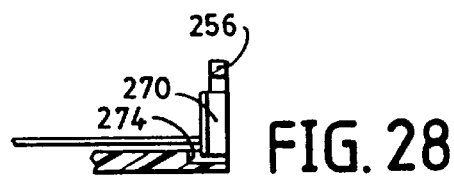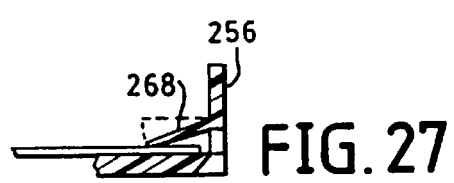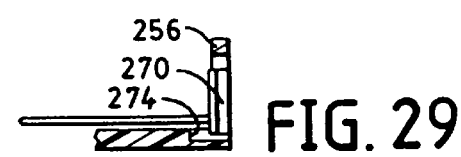

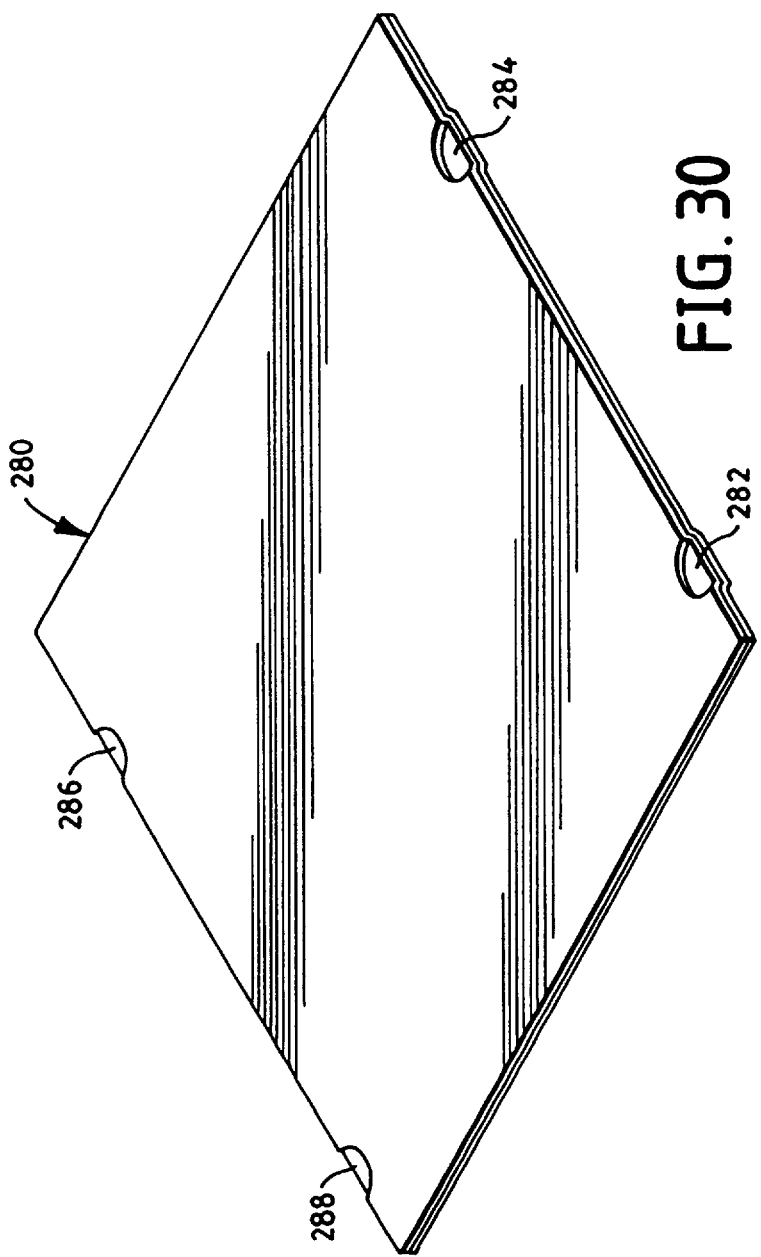
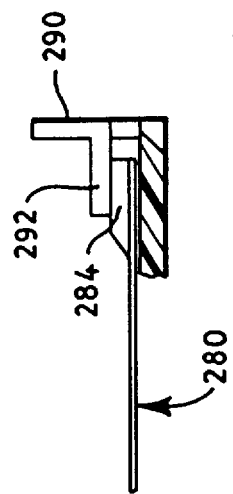
FIG. 30
FIG. 31

BOX CONTAINER SYSTEMS AND DISPLAY FRAMES WITH TWO-DIMENSIONAL MULTIPLE VIEW OPTICS

CROSS REFERENCE TO RELATED APPLICATION

This application is a continuation-in-part application of U.S. patent application Ser. No. 08/222,632 filed on Apr. 1, 1994, now abandoned in favor of Application No. 08/795,659 filed on February 6, 1997 U.S. patent application Ser. No. 08/338,246 filed on Nov. 14, 1994, now U.S. Pat. No. 5,588,526 and U.S. patent application Ser. No. 08/508,380 filed on Jul. 31, 1995, all commonly owned herewith.

BACKGROUND OF THE INVENTION

1. Field of the Invention

This invention relates generally to storage and display boxes, display frames, and, more particularly, to optical arrangements for providing enhanced viewing of textual, graphic, and/or other symbolically coded information located on or inside of storage and/or display boxes for merchandise such as compact discs, audio tapes, or the like.

2. Description of the Prior Art

With the continuous improvements in digital storage media and recording technology, it is increasingly possible to store more and more information, particularly imaging and audio information, in smaller and smaller physical spaces. More recently, multimedia and even digital video of feature length motion pictures have become a reality. As the physical size of such media shrinks, it has been a challenge to provide packaging and advertising materials of some sensible scale which permit a potential customer to learn about the contents stored in the media while at the same time not occupying too much retail shelf space.

One important digital media for such storage applications is the compact disc, although magnetic media in the form of discs and tapes is also still an important storage media. Compact discs, which were first developed by Philips and Sony in the early 1980s, are now a well-established form of medium for recording a variety of retrievable information. Their popularity and success stem from their compactness, convenience, competitive cost, and high information storing capacity.

Physically, such discs are thin, flat, circular objects approximately 12 cm in diameter by about 1.2 mm thick. They are provided with a central hole about 18 mm in diameter for purposes of mounting them for rotation in various devices capable of reading and writing information to and from them. Typically, audio, video or other data is recorded in digital form on one surface of the disc with the opposite remaining free for carrying information about the contents of the recorded information.

For enabling writing and recording information, a compact disc (CD) comprises a clear plastic layer over a reflective aluminum surface. Data, of whatever type, is stored on the disc in binary code; the 'ones' of the code being dents or pits in the plastic surface while the 'zeros' are represented by smooth plastic. When playing the disc, a laser beam scans the disc surface as it rotates and is reflected back only by the 'zero' areas. Reflected light pulses are picked up by a photodetector which converts them into a digital electrical signal that can then be further processed for subsequent use in various playback devices appropriate for the type of information recorded in the disc.

While very popular for audio recording, CDS also can be used for storing video and multimedia information, which applies the same technology. These have advantages over magnetic tape by virtue of being easier to replicate and randomly access.

CDS are also used to store large amounts of computer information. Here, CD-ROM (compact disc with read-only memory) is the most common format, but other forms of disc are available that allow data to be written on the disc as well as read.

Recent applications for CD use include the photo-CD, which records still images for viewing on a television screen or reproduction as hard copy, and the multimedia CD, which holds pictures, sound, and text information on one disc and can play it back through television receivers and hi-fi equipment or appropriately configured computer systems.

While CDS are physically robust because information is digitally encoded and optically read, they obviously are not immune to damage and thus require protection from mishandling and environmental effects which could destroy or compromise their information bearing surfaces or otherwise threaten their physical integrity.

Consequently, CDS are usually shipped, stored and marketed in correspondingly flat containers referred to as "jewel boxes". Such boxes are generally made of a durable, transparent plastic such as polycarbonate or styrene and have been designed to occupy the minimal amount of space consistent with their protective function. As a result of this, and the fact that CDS can carry so much digitally encoded information, space available on the surfaces of the jewel box for providing information about their contents is at a premium, especially since the practice of packaging CDS with "spaghetti" boxes has been discontinued because of environmental pressures associated with the accumulated waste from the sale of large volumes of CDS.

Since the disappearance of the spaghetti box from the marketplace, the current technique for informing CD users about the contents of recorded CD information is to provide the information in the form of thin paper booklets or sheets that are visible through the flat, transparent panels of a jewel boxes' front cover or base, or both. In addition, use is also made of the hinge edge of a box for displaying cryptic information about the title and author or artist of the CD. However, the limited exterior surface area of the conventional CD box, in turn, limits the amount of information that can be seen through any one surface thus requiring relevant information to be distributed among available surfaces. This forces a prospective buyer to flip through stacks of CDS while scanning the front covers in search of the identity of a particular CD, usually by title and/or artist, that may be of interest and then turning the box around to examine the rear surface for information about the detailed contents. Studies have shown that this results in the loss of multiple, and perhaps primary, sales because the process is time consuming and frustrating for the consumer. Hence, there is a need for a solution to the foregoing problems, and it is a primary object of this invention to provide solutions through the use of optical arrangements which enhance the viewing opportunities and amount of information that can be visually detected by a prospective CD owner.

While optical approaches have been used in the past for direct magnification of content information about the insides of containers, none have provided more visual access to more information on the same viewable area or, more importantly, different information viewable through the same box surface. For example, British Patent No. GB 2222143 entitled "BOXLIKE LIKE CONTAINER" published on Feb. 28, 1990 discloses the use of a plano-convex, positive cylindrical lens arranged along the hinge edge of a tape cassette or compact disc box for purposes of providing magnification of informational matter carried directly behind it.

U.S. Pat. No. 4,863,026 entitled "STORAGE CASES FOR INFORMATION RECORDING DEVICES", issued on Sep. 5, 1989 discloses a Fresnel lens incorporated in or on the front cover panel of a case for purposes of magnifying information carried on the surface of a program card inserted in the case such that it lies directly beneath the lens. In like manner, U.S. Pat. No. 4,044,889 entitled "COSMETIC CONTAINER INCLUDING INTEGRATED LENS STRUCTURE", issued on Aug. 30, 1977, also shows a Fresnel lens for magnifying tiny underlying information carried on the interior of a cosmetic container.

U.S. Pat. No. 4,863,026 entitled "STORAGE CASES FOR INFORMATION RECORDING DEVICES", issued in the name of Thomas J. Perkowski on Sep. 5, 1989, discloses a Fresnel lens arranged on the front cover of a magnetic tape, video tape, or compact disc storage box for magnifying information located directly behind the front cover at an appropriate distance.

Similarly, U.S. Pat. No. 4,044,889 entitled "COSMETIC CONTAINER INCLUDING INTEGRATED LENS STRUCTURE", issued to Seymour Orentreich, et al. on Aug. 30, 1977, describes the use of Fresnel lens structures for magnifying information located on the interior surfaces of cosmetic containers.

U.S. Pat. No. 5,189,531 entitled "HOLOGRAM PRODUCTION", issued to Charles E. Palmer, et al. on Feb. 23, 1993, describes techniques for forming holographic images in cosmetic compact covers or compact audio or video discs or the like.

In view of the known art, there continues to be a demonstrable need for more effective ways of providing significantly improved visual access to flat storage containers and display boxes for purposes of informing prospective users about the contents of the containers and for making their contents more attractive to induce increased sales or, more simply, for displays, such as image frames, that are capable of providing multiple image viewable from different perspectives. Consequently, it is a primary object of this invention to fulfill this need.

Another object of the present invention is to provide two-dimensional optical arrangements by which the viewable surfaces of flat containers or display frames may be exploited to provide views of different information or images by observing those surfaces from slightly different azimuthal and elevational perspectives.

Yet another object of the present invention is to provide optical arrangements by which encoded information, multiple images, and stereo pairs may be provided on a viewable surface.

Yet another object of the present invention is to provide optical viewing arrangements for compact disc containers that can be implemented by relatively minor modification of currently existing molds for fabricating them.

Still another object of the present invention is to provide optical arrangements by which pseudo-dynamic information may be provided to an observer of a flat container box or display frame.

Another object of the present invention is to provide an optical arrangement employing a lenticulated surface structured to compensate for parallax effects at customary viewing distances.

Yet still another object of the present invention is to provide printed informational materials, such as booklets and the like, that can be inserted into flat boxes utilizing existing equipment.

Still another object of the invention is to provide printing methods for fabricating inserts that carry multiple interlaced images for use with lenticular screens.

Other objects of the invention will be apparent and will appear hereinafter in the following detailed description when read in connection with the drawings.

SUMMARY OF THE INVENTION

Two-dimensional optical arrangements are provided by which observers of flat containers or display boxes, such as compact disc (CD) jewel boxes, and display frames can be presented with different information in the form of multiple images either about the contents of the box or simply different images when looking at one of its surfaces from different angular perspectives. Panels including two-dimensional arrays or mosaics of lenslets, preferably square and rectangular in shape, are used in combination with interlaced images to convey the differently coded views without the need for physically manipulating such boxes as in the past to see equivalent information. These arrangements enhance the possibilities for displaying more and different kinds of information on a given box or display surface area compared with conventional approaches, and as such, enhance the prospects for increasing initial and multiple sales of CD products and display frames for sports figures, family members, celebrities, animation, artwork, messages, and similar images or combinations of them.

The interlaced images preferably are carried on printed card inserts as 2D arrays of image segments in optical registration with the lenticulated surfaces, printed on interior surfaces or exterior surfaces of a box or front surface of a compact disc, or some combination of all possibilities. Whatever the means for presenting the interlaced images to the lenticulated surfaces used in the invention, it is important to align it within tolerable limits with the optical axes and focal plane of the lenslets to assure image quality and crisp separation, although for special effects, such as morphing, these requirements may be intentionally relaxed.

In preferred embodiments, the spatial frequency of the lenticulated panels and interlaced images are arranged with respect to one another to compensate for parallax effects which would otherwise be present when the flat panels are observed at customary viewing distances. Preferably, the spatial frequency of the interlaced images is adopted as fixed, and the spatial frequency of the lenticulae is made higher by a factor approximately in the ratio of the viewing distances to their respective planes, adjusted for refraction effects of the lenslets themselves as needed along a radial direction or mutually orthogonal axes as the case may be.

The interlaced images are preferably carried on multipaneled, printed, inserts that are folded to be compliant so that, when inserted into a box, they are resiliently urged to lie flat, within tolerances, against the plane containing the loci of focal lines of the lenticulae. Preferably, the panels of the inserts are adjusted in length so that when folded a bow is induced in the panel to provide it with a spring action when compressed or to assume a predetermined curve when free standing.

In addition to compliant printed inserts, arrangements utilizing mechanical resilient sections are disclosed which lift the printed inserts into the focal plane of the lenslets and otherwise align a reference edge of the printed insert against a reference line of the box to assure angular alignment of the interlaced images and the axes of the lenslets.

Special snap or clip-on lenticular panels are disclosed for use with printed graphics and the like located on the exterior surfaces of a container box or the like. Here, alignment takes place automatically when the panel is clipped to the exterior surface.

Multiple image displays, which include sporting figures or family members or the like, are disclosed. In these, alignment with the lenslets is preferably achieved by virtue of the fit provided between the printed insert and a compartment or channels adapted to receive the insert. Alternatively, the fit may be relaxed, and the printed card mechanically forced into a registration position through the use of mechanical resilient fingers.

The printed inserts themselves may be selectively embossed to provide compliant features that resiliently urge the insert into alignment with the focal plane and axes of the lenslets.

DESCRIPTION OF THE DRAWINGS

The structure and operation of the invention, together with other objects and advantages thereof, may best be understood by reading the detailed description in connection with the drawings in which unique reference numeral have been used throughout for each part and wherein:

FIG. 4a is a diagrammatic perspective of an inventive compact disc box system having a front panel mosaic of two-dimensional rectangular shaped lenslets;

FIG. 4b is a diagram of an orthogonal coordinate system showing the azimuthal and elevational angles, $\phi$ and $\theta$, respectively of a typical perspective point;

FIG. 5a is diagrammatic perspective of an inventive compact disc box system having a front panel mosaic of two-dimensional square shaped lenslets;

FIG. 5b is a diagrammatic perspective showing a typical lenslet, illustrating that it is a truncated sphere in form with a plano rear surface and spherical front surface and that it can be either rectangular or square in cross-section;

FIG. 23 is a diagrammatic, plane view of the front cover of FIG. 22;

FIG. 24 is a diagrammatic, side elevational view of the front cover of FIG. 22;

FIG. 25 is a diagrammatic, sectional view of the front cover of FIG. 23 taken generally along line 25—25 thereof;

FIG. 26 is a diagrammatic, sectional view of the front cover of FIG. 25 taken generally along 26—26 thereof;

FIG. 27 is a diagrammatic, sectional view of the front cover of FIG. 25 taken generally along 26—26 thereof shown in combination with a fragment of a printed insert;

FIG. 28 is a diagrammatic, sectional view of the front cover of FIG. 25 taken generally along 28—28 thereof;

FIG. 29 is a diagrammatic, sectional view of the front cover of FIG. 25 taken generally along 28—28 thereof shown in combination with a fragment of a printed insert;

FIG. 30 is a diagrammatic, perspective view of a printed insert of the invention embossed with features to make it selectively compliant for purposes of aligning it with the focal plane and/or longitudinal axes of the lenslets of the invention;

FIG. 31 is a diagrammatic, cross-sectional, elevational view of a fragment of the embossed printed insert of FIG. 30 shown in combination with a fragment of a front cover of the invention to illustrate the interaction between the embossed sections of the printed insert with the tabs of the front cover;

BACKGROUND

Figure 1:
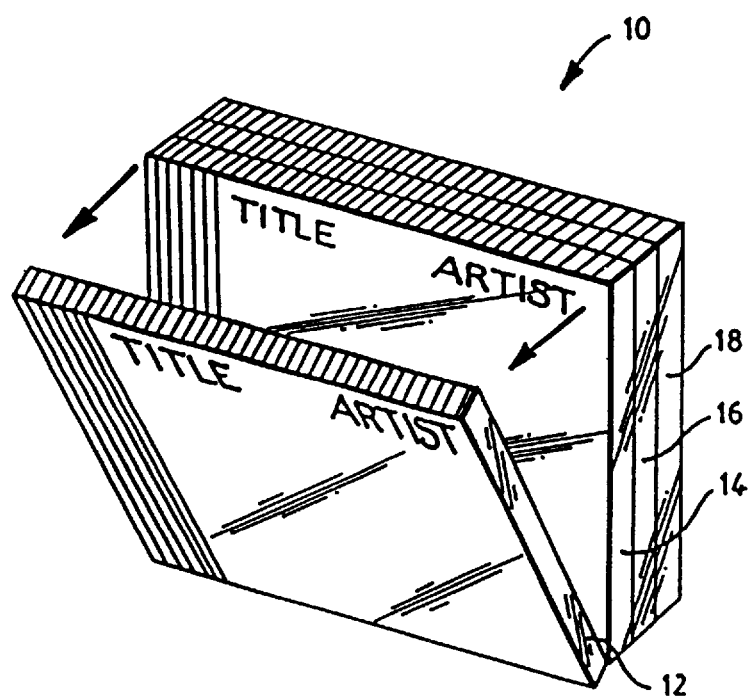
FIG. 1 is a diagrammatic perspective view of a plurality of conventional CD jewel boxes stacked to illustrate the identification problem a consumer usually encounters during the buying process.

Reference is now made to FIG. 1 which shows a stack of flat storage and display box systems for compact discs. The stack is generally designated at 10 and comprises a plurality of individual boxes 12, 14, 16, and 18, which are all identical and of conventional design for storing and displaying compact discs (CDS) such as those for recording and playing back audio information. However, it will be understood that other forms of information such as data, video, multimedia, or graphics could just as easily be recorded on such CDS.

Figure 2:
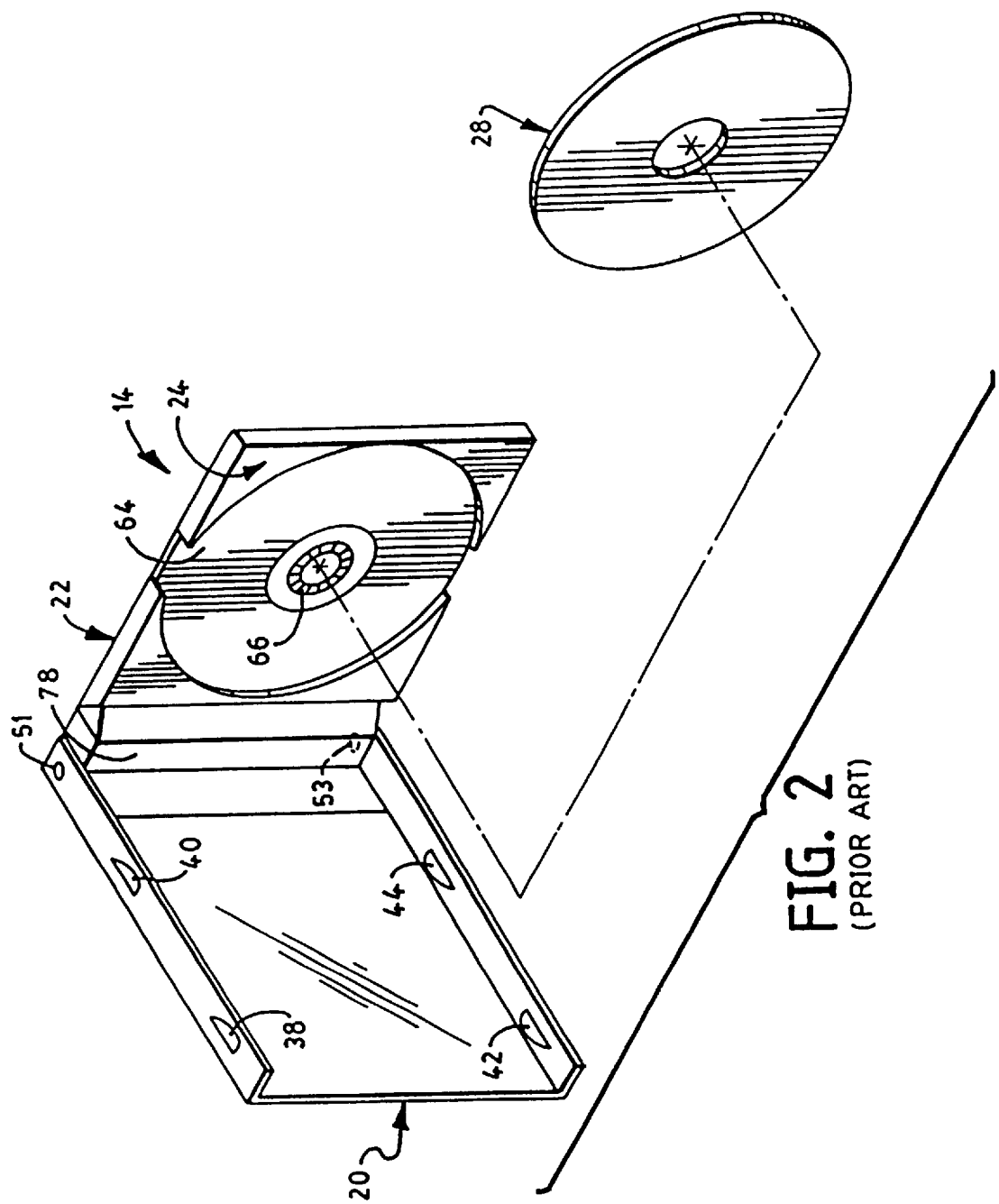
FIG. 2 is a partially exploded, diagrammatic perspective view of a conventional CD jewel box shown in its opened position along with a compact disc.
Figure 3:
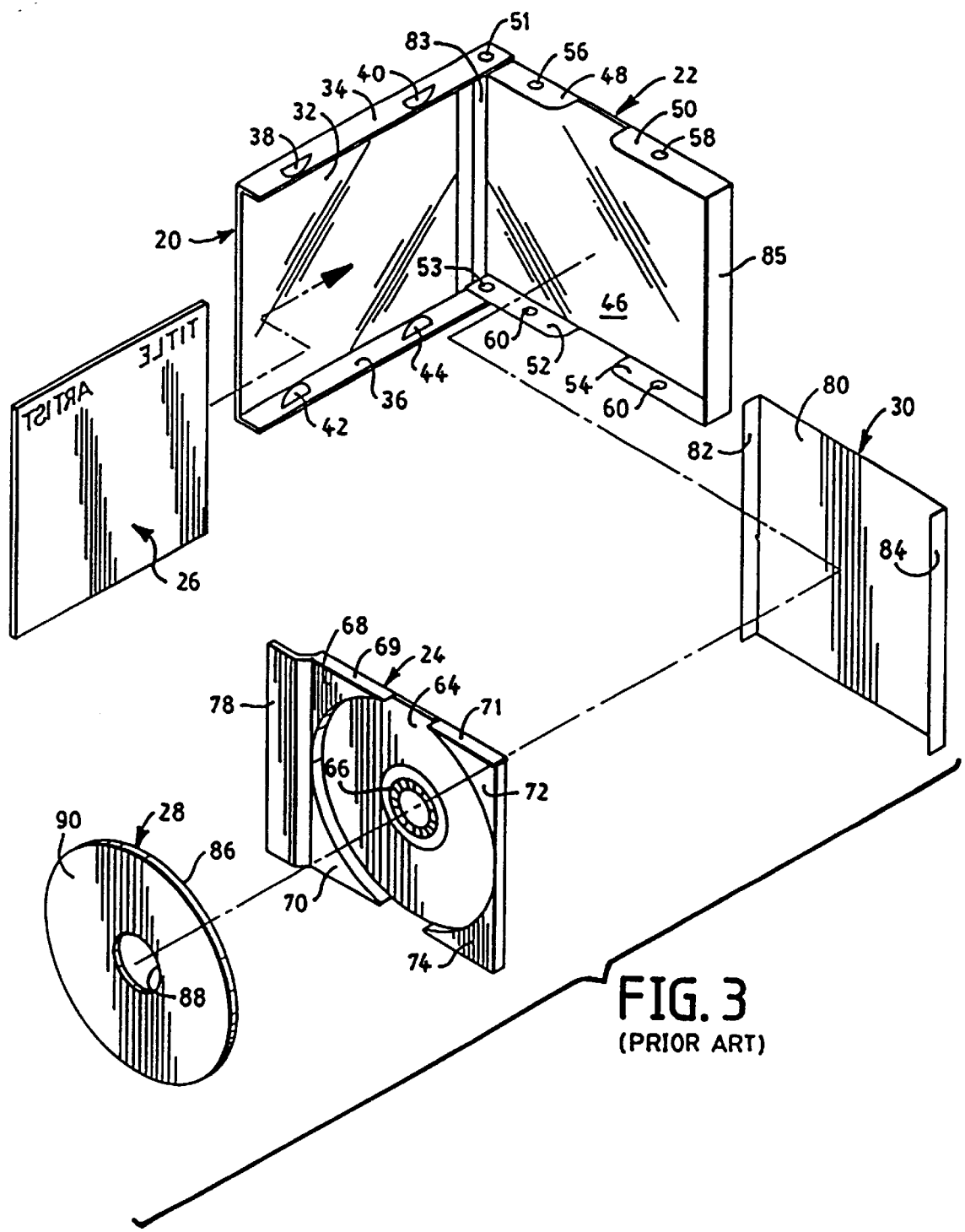
FIG. 3 is an exploded diagrammatic perspective view of a conventional CD jewel box and its various contents including a CD, program insert, and base insert with folded edges.

As best seen in FIGS. 2 and 3, each compact disc box system, considering box 14 for example as exemplary, comprise the following major components: a front cover 20, a rear base 22, a compact disc carrier or holder 24, an informational booklet 26, which typically carries printed graphical and textual information describing the recorded contents of the box, a compact disc 28 which bears recorded information, and a folded printed insert card 30, which typically carries a shortened textual and graphic description of the contents of the recorded information.

Front cover 20, rear base 22, and disc holder 24 are all injection molded of a suitable plastic with a wall thickness of about 1.2 mm. Overall, each box measures about 142 mm×124 mm×10.4 mm as pictured in FIG. 1 in their closed state.

Typically, front cover 20 and rear base 22 are transparent and molded of styrene or polycarbonate, while disc holder 24 may be made of either transparent or opaque plastic, colored as desired.

Referring now to FIG. 3, it can be seen that front cover 20 comprises a front flat panel 32 which has upper and lower raised edges 34 and 36, respectively. Upper raised edge 34 has a pair of spaced apart tabs, 38 and 40, extending outwardly therefrom while lower raised edge 36 is provided with a similar pair of tabs, 42, and 44. Tabs, 38 to 44, are configured and arranged to have corresponding edges of booklet 26 slide underneath them to retain it with its front surface against the rear surface of transparent front cover panel 32. In this manner, information carried on the front page of booklet 26, such as the title and artist's name for an audio disc, can be clearly seen through the front surface of front cover 20. Booklet 26 is automatically inserted into the space or "pocket" formed between the rear surface to the front cover 20 and the oppositely facing surfaces of the tabs. This is achieved through the use of high speed equipment designed especially for this purpose and widely available throughout the industry. Part of this invention, as will be seen, is to provide informational inserts, like booklets, that are adapted for use with such high speed equipment while having features particularly suitable to other purposes of the invention.

Rear base 22 also has a transparent flat panel that is designated as 46. Extending outwardly from flat panel 46 are a plurality of raised edge sections 48, 50, 52, and 54. Raised edge sections, 48 and 52, are provided with shallow circularly symmetric holes that cooperate with short complementarily configured posts on the back end of front cover upper and lower edge, 34 and 36, respectively, to provide a pair of pivots, 51 and 53, respectively. Pivots, 51 and 53, permit front cover 20 and rear base 22 to be hingedly connected to one another for movement between open and closed positions.

Folded insert 30 comprises a flat panel section 80 and two raised end edges 82 and 84, all of which can carry printed textual or graphical information. Typically, edges 82 and 84 carry just textual information.

During the assembly of a typical box storage and display system, insert 30 is usually automatically placed in rear base 22 with its information bearing section 80 against the rear surface of transparent flat panel 46 so that it can be readily perceived from the opposite surface by a CD user or customer.

In this connection, the information carried on raised edges 82 and 84 can be seen, respectively, through left and right edges, 83 and 85, respectively, of rear base 22. Left edge 83 in this instance corresponds to the hinge edge of a typical box system.

Compact disc holder 24 functions to retain insert card 30 flush with the rear surface of rear base flat panel 46 and to retain a compact disc in place. For these purposes, disc holder 24 comprises a circular tray section 64 with a flexible hub 66. Extending above circular tray section 64 are four raised edge sections, 68, 70, 72, and 74, located at the four corners of disc holder 24 and shaped to provide a rim for protecting the peripheral edges of a compact disc.

Each raised edge section, 68–72, includes raised dimples (only two shown), such as those at 69 and 71, that are adapted to be snap-fitted with corresponding tab section detent holes, 56–62, in rear base 22. In this manner disc holder 24 snaps into and is retained in rear base 22.

Compact disc 28 is seen to be a flat circular object with a front surface 90, rear surface 86, and central circular mounting hole 88. Rear surface 86 carries recorded information with front surface 90 typically carrying printed information identifying the CD recorded contents by title and artist or the like.

CD 28 is held in place by disc holder 24 with its recorded information bearing surface 86 against the front surface of circular tray section 64 so that it is protected against damage. To accomplish this, a user simply aligns flexible hub 66 with circular hole 88 and then pushes against compact disc 28 until it compresses the flexible fingers of hub 66 inwardly. Further inward pressure causes the flexible fingers by design to expand after certain portions clear the thickness of a CD to trap disc 28 in place.

Disc holder 24 also includes a rectangularly shaped raised deck 78 that protrudes through front cover 20 near the hinge edge. Deck 78 is usually provided with surface serrations extending along its longitudinal direction to provide a grip for ease of handling by the user and during manufacture.

In the assembled state as shown in FIG. 1, the information bearing surfaces in such compact disc storage and display box systems can usually only be seen by flipping through them in the manner illustrated. Because of the display arrangements adopted by retailers, it is typically only possible to flip through boxes to scan the information appearing through their front covers to identify their contents. The alternative is to pick the box up and examine all of its sides for the needed information. No information can be seen through either top or bottom edges in the position in which they are usually displayed, and the information that might be seen through the hinge or right edge of a box system is also obscured in this display position.

As will be seen in the following description, the foregoing problems with the conventional CD storage and/or display box systems or pictorial frames are solved with novel optical arrangements for providing a user or customer with more and different opportunities for more easily observing information about the contents of CDS and for enhancing the opportunities for more creative advertising approaches to marketing CDS or for displaying other pictorial or graphical information in pictorial frames and the like.

DETAILED DESCRIPTION

The present invention relates to the use of printed materials which carry interlaced images in combination with arrays or mosaics of two-dimensional lenslets embodied in container boxes, particularly flat boxes, and displays, for the purpose of providing different graphical and pictorial information when the boxes or displays are viewed form different angular perspectives which can vary in azimuth and elevation, or both. Also possible are three dimensional effects when viewed from a single perspective or special effects such as morphing as the relative perspective between viewer and box or frame varies.

The various embodiments of the invention share common features for accurately locating the interlaced printed images with respect to a reference edge or line(s) on the printed materials, and with respect to the lenslets, when the printed materials are inserted into the boxes or displays. These are embodied in different preferred container box and display configurations, although are not restricted solely to those disclosed. Also, it will be seen that certain features disclosed in connection with one embodiment may be used in other embodiments where desired.

The interlaced images are preferably formed in two dimensions as needed as array of image segments by standard offset printing or desktop publishing techniques using as output devices offset printing presses or high-resolution, half-tone color printers. First, the desired content of the different views are scanned and then electronically interlaced with suitable software. Afterwards, the interlaced images are then output in electronic form in a standard format that is acceptable to the printing industry. This could be a file in TIFF or PostScript format. This file then serves as the input to standard printing technology to generate the materials which are then cut for proper fit and/or provided with alignment features which permit their accurate insertion in a box or display structure in a manner to be described.

The alignment features use several approaches. Either the fit between the printed materials and the alignment features are made sensibly loose and the clearance is taken up by flexible elements that resiliently urge the printing material to the necessary alignment position and attitude within required tolerances or the fit is controlled so that any resultant clearances between the printed materials and the receiving structure doesn't permit misalignment beyond what is needed. In some embodiments both approaches may used or elements of both may be sensibly mixed.

Several different embodiments which incorporate the invention include a CD jewel box, which could easily be used as a stand alone display, a container for general merchandise, and a display for sporting figures, family members, graphics, animation, textual and/or pictorial messages, or the like.

Referring now to FIG. 4a, there is shown an embodiment of the inventive box system designated generally at 100. Box system 100 comprises a front cover 102 hinged to a rear base 104 about a pair of pivots (one of which is shown at 109). Inside of box system 100 is a compact disk holder of novel design (like that shown in FIG. 18) and having a grooved deck 106 which is more easily gripped for ease of handling.

Front cover 102 is preferably molded of a durable plastic such as styrene or polycarbonate and includes a transparent, flat, panel 110 in which there are formed in its front surface a plurality of regularly oriented adjacent individual two-dimensional lenslets 112 which make up an array or mosaic. While lenslets 112 are shown enlarged many times, it will be appreciated that in practice they are small, having spatial frequencies ranging between, for example, 1 to 10 lenslets per millimeter. Preferably, lenslets 112 are in a regular or periodic array as shown, but can otherwise be arranged so long as the correspondence between individual lenslets and their associated image segments is maintained. As shown in FIG. 4a, each lenslet 112 is rectangular in cross-sectional shape but can take on other shapes as will be seen.

Information in the form of interlaced printed images resides in a plane behind the front cover lenticulated panel 110 which operates in a manner to be described to provide an observer with a plurality of different images depending on the angular perspective from which front cover 102 is observed. FIG. 4b illustrates that the angular perspective of an observer looking at the different views available varies in azimuth angle, $\phi$, and elevational angle, $\theta$. For each predetermined angular perspective in $\phi$ and $\theta$ space, there corresponds a unique image presented to an observer. That image is formed of a collection of image segments uniquely associated with each particular individual lenslets 112. By controlling the location of an image segment in relation to an individual lenslet, different images can be presented to observers viewing from different perspectives while maintaining separation between images where that is the purpose desired.

Figure 6:
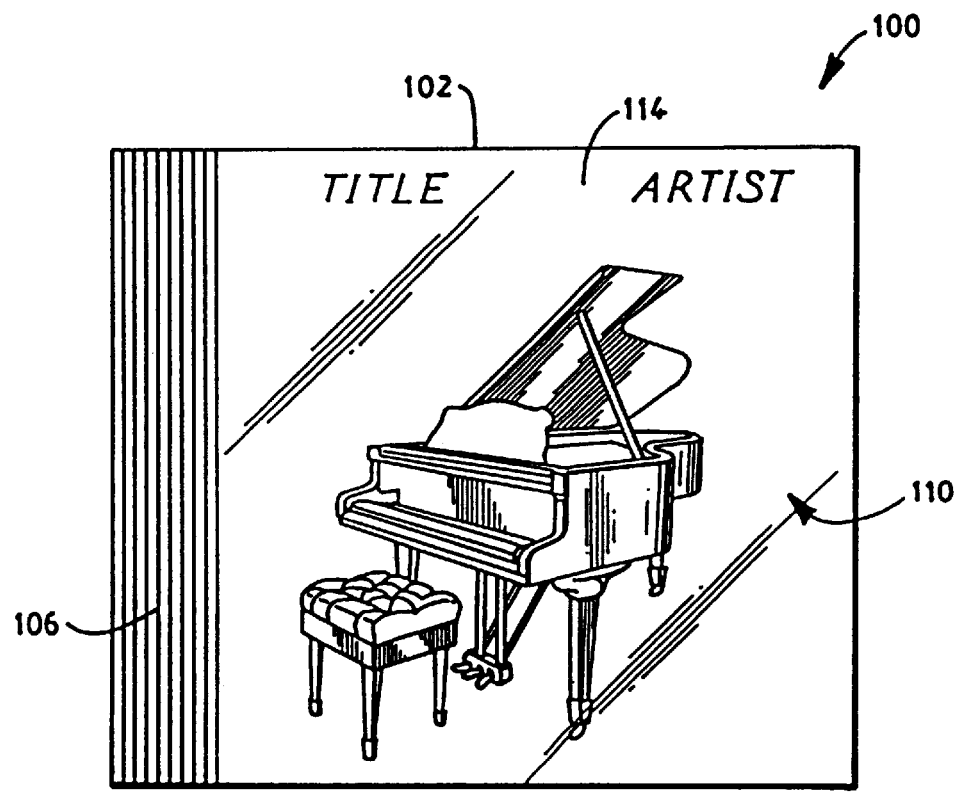
FIG. 6 is a diagrammatic illustration showing one possible view presented to an observer looking along a first path of observation at the front of the compact disc box system of FIG. 4a, for example, with either $\phi$ positive valued and $\theta=0$ (from the right looking straight ahead) or alternatively, with either $\phi=0$ and $\theta$ positive valued (looking down from straight ahead)
Figure 7:
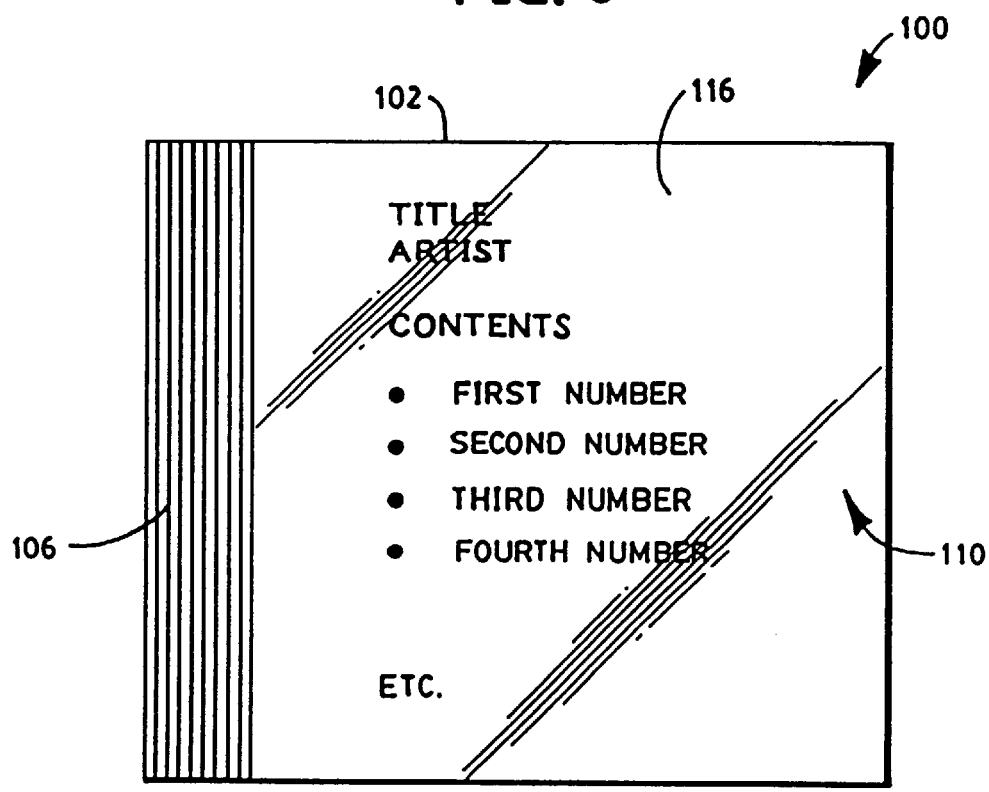
FIG. 7 is a diagrammatic vertical elevational view of another possible view presented to an observer looking along a second path of observation, angularly separated from the first when looking at the front of the compact disc box system of FIG. 4a, for example, with either $\phi$ less positive valued and $\theta=0$ (less from the right looking straight ahead) or alternatively, with either $\phi=0$ and $\theta$ less positive valued (looking less down from straight ahead)

FIGS. 6 and 7 show examples of the different type of messages that an observer may see along such different angular perspective paths of observation. As shown in FIG. 6, an observer may be presented with a logo, title and/or artist information regarding the contents of a CD while viewing along one path where the angular perspective could, for example, be with either $\phi$ positive valued and $\theta=0$ (from the right looking straight ahead) or alternatively, with either $\phi=0$ and $\theta$ positive valued (looking down from straight ahead), FIG. 7 is a diagrammatic vertical elevational view of another possible view presented to an observer looking along a second path of observation, angularly separated from the first when looking at the front of the compact disc box system of FIG. 4a. This view, where the observer can see the contents of individual numbers on the CD, as in the case of an audio CD, can be from, for example, an angular perspective with either $\phi$ less positive valued and $\theta=0$ (less from the right looking straight ahead) or alternatively, with either $\phi=0$ and $\theta$ less positive valued (looking less down from straight ahead) than the perspective corresponding to FIG. 6.

While two separate views have been illustrated in connection with the description of the embodiment of FIG. 4, it will be appreciated that more than two views are quite feasible depending on the number of interlaced images provided, and such views of different information may also be presented to an observer viewing the flat wall of rear cover 104 as well. It should also be appreciated that such views can periodically repeat themselves as the angle of view over the surface of the lenticulated surface changes.

In FIG. 5a, an alternate embodiment of the invention is presented. Here, a box system 120 comprises a front cover 122 pivotally hinged to a rear base 124 via a pair of pivot points (one shown at 125). Box system 120 also has a novel disc holder (like that shown in FIG. 18) with a grooved deck 126 that protrudes through a cutout in front cover 122. Deck 126 and a front cover side 128 have serrations or grooves as before for improving gripping and handling.

Front cover 122, as before, is injection molded of a transparent plastic in a well-known manner and includes a flat, lenticulated front panel 130 having a plurality of adjacent lenslets 132 in the form of a regular array or mosaic. Lenslets 132 operate as before to provide a plurality of informational views that in general are angularly separated vertically and horizontally in planes that are perpendicular to orthogonal axes of lenslets 132. Here again, the views, which may be used to present different observable messages can correspond to those of FIGS. 6 and 7, or their information may b altogether different from that illustrated in FIGS. 6 and 7.

As can be appreciated, each lenslet 112 operates in a well-known manner (explained in detail hereinafter) as a convex lens to project an image segment from associated image segments corresponding to predetermined azimuths and elevations. Thus, there is a one-to-one mapping between individual image segments and corresponding angular viewing perspectives. For this mapping function, individual lenslets 112 or 132 preferably are made in the form of a truncated sphere as shown in FIG. 5b. Each truncated sphere includes a convex front surface 114, preferably spherical, but aspherical in shape if requirements demand such a shape. Facing front surface 114 is a piano rear surface 116. In transverse cross-section the truncated sphere may be rectangular with the lenslets 112 of FIG. 4a or square as with the lenslets 132 of FIG. 5a. To form the necessary mold inserts for replicating such shapes, use may be made of a variety of wellknown techniques as, for example, diamond point grinding or step and press mastering.

Figure 5C:
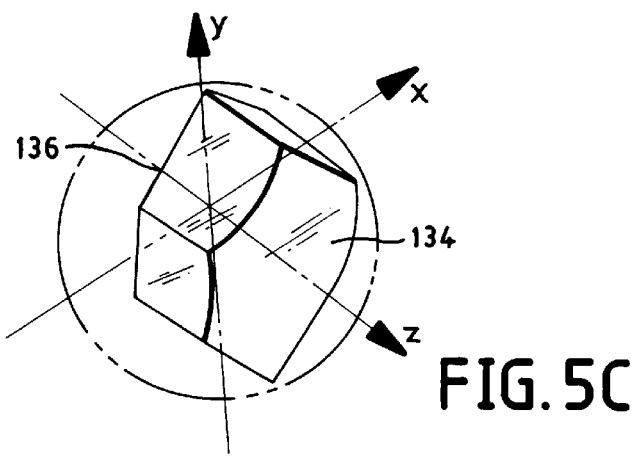
FIG. 5c is a diagrammatic perspective showing that a typical lenslet, while a truncated sphere in form with a piano rear surface and spherical front surface can be hexagonal in cross-section.

FIG. 5c illustrates yet another cross-sectional shape for a lenslet. Here, lenslets may be hexagonal in cross-sectional shape since this is a shape that will conveniently pack. Other shapes such as triangular may be used, but care must be taken to preserve the image and angular perspective mapping linkage. If necessary to avoid unintentional artifacts, use may be made of guard bands around adjacent image segments to visually isolate them from one another. Here, the image guard bands may be clear or uniform gray tones, or the like. Certain lenslet cross-sectional geometries may be such that parts of nearby image segments that should not be viewable may be seen through the wrong lenslet. If such a situation exists, it is possible to anticipate given a particular lenslet geometry and compensate for it by making appropriate image content adjustments as a function of spatial location.

More particularly, it will be recognized that each lenslet as a convexplano thick lens obeys the well-known optical equations that apply to such lenses. For refined optical design of the lenslets beyond the application of thick lens equations, detailed ray analyses will customarily be applied in a well-known manner.

Information cards are provided in the form of printed inserts are located so that their image carrying surface is at or near contact with the rear surface of the lenticulated panels 110 or 130, as the case may be. As previously mentioned, such information cards bear an interlaced image, i.e., the images of the various views to be presented to a viewer broken up into tiny adjacent regularly spaced image grids where the lenslets are also regularly spaced, alternately one image segment from one view and so on over the entire image. The interlaced images are placed behind lenslets 112 or 132 so that different combinations of them can be seen along the different angular perspectives; each lenslet 112 providing a view of part of the whole image which collectively are perceived as a synthesized whole by the observers visual system without notice of the individual lenslets themselves because of their size in relation to the visual acuity of the eye.

The insert or printed informational cards may be positioned laterally, vertically, and rotationally through the use of arrangements to be described. Suitable means such as resilient means are provided to keep the printed insert cards pressed against or near the focal plane of lenslets 112 or 132 to assure that the printed matter on a card is located at the proper distance from the loci of focal points of lenslets 112 or 132 and to assure proper rotational alignment between interlaced images and lenslets.

Where it is desired to utilize existing high-speed, industry wide equipment to insert informational materials, such as printed materials, in the box system of the invention, approaches other than the use of registration pins as those of the past may be beneficially used for alignment purposes, keeping in mind that such materials must be aligned within acceptable visual tolerances with respect to the loci of focal points of the mosaic surfaces, i.e., they must be flat over the area of visual interest, and must not be twisted, or tilted, with respect to the axes of the lenslets. More particularly, informational inserts such as booklets must be self flattening, or otherwise rendered flat within required tolerances when in position, and preferably fit into the space provided between the current standard retention tabs and the flat surface carrying the mosaic panel so that current molds do not need to be modified especially to accommodate the inventive informational materials. The depth of space available between the retention tabs and the flat surface carrying the lenticulars is approximately 0.085 to 0.090 inches. With typical paper thickness used for booklets, for example, running at about 0.005 to 0.006 inches, it is clear that, even for booklets consisting of multiple panels, a substantial amount of available space must be filled to hold any instructional materials in place and properly aligned with the lenslets, both axially and rotationally. Moreover, since any informational insert, particularly those for use in the front cover, is suspended over a large span between oppositely facing tabs, it must be stiff perpendicular to this direction and resilient in a direction opposite so that it will flatten against the lenslets over their whole area within the tolerances dictated by the depth of focus of the optics. For a circle of confusion of about 0.005" (visual acuity), a typical lenslet spatial frequency of 50 lenslets per inch, and a thickness of approximately 0.060, this depth of focus is about plus or minus 0.008 inches.

Figure 8:
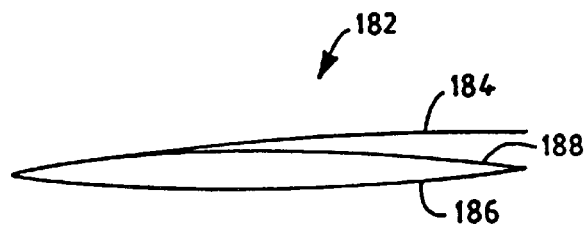
FIG. 8 is a diagrammatic side elevational view of a preferred, multi paneled, printed booklet that may be used in the practice of the invention showing that, in its free standing folded configuration, the booklet is bow shaped and compliant.
Figure 9:
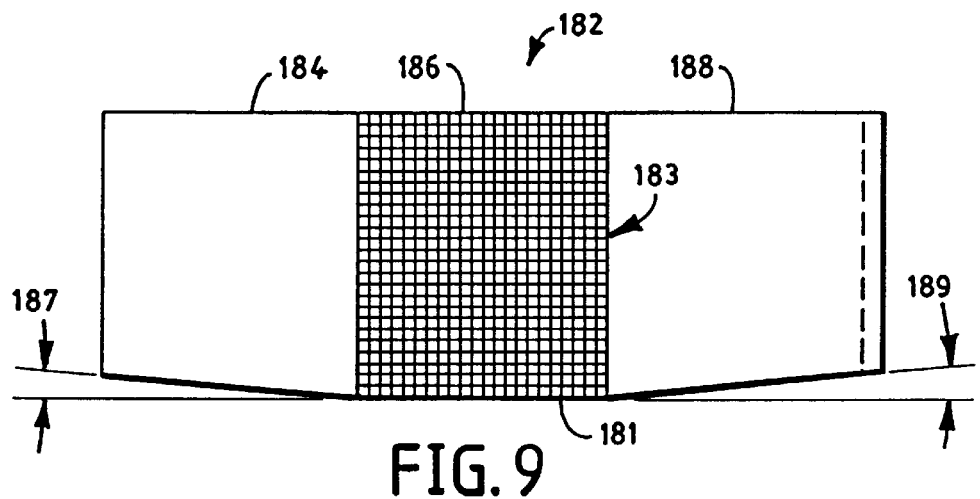
FIG. 9 is a diagrammatic, unfolded plan view of the booklet of FIG. 8.

To solve this problem, several inventive embodiments of informational inserts have been made based on the principle discussed. Various approaches to making such inserts with the needed properties have been found useful. FIG. 8 shows a double folded, multiple panel, booklet 182 having three panels, 184, 186, and 188, having sharp creases between them, with the free edge of inwardly folded panel 188 entering the first crease formed between panel 184 and 186. Here, the lengths of the panels are selected so that, when folded, the edge of the last panel folded interferes with the first crease to cause the last panel to buckle under the induced compression set up in this way. This, in turn, creates the compliance needed, and the compliance may be adjusted as required by a simple length adjustment. For example, as shown in FIG. 9, the last panel to the right (188) may be made longer than the two to the left of it (184 and 186), or alternatively, in one preferred embodiment, the outer two panels may be of the same length and the middle one made shorter. Clearly, this approach makes for a reliable method of controlling resilient properties by controlling length instead of the characteristics of the creases and material properties on which information is printed.

As further seen in FIG. 9, the central panel 186 carries interlaced images. The image is shown divided in an array of squares 183 which can be grouped as needed into image blocks containing all of the image segments that are to be projected thorough a single lenslet along all of the predetermined perspectives. Conveniently, square lenslets in a regular array would have square format corresponding to the number of desired views. If four views were desired, then there would be four image segments arranged in four quadrants. If nine views, then the block would be 3 by 3. Rectangular and other geometries are correspondingly of different block format depending on the desired views. Panel 186 also is important because it is provided with an edge or reference line 181 that interacts with box structure in a manner to be described to align interlaced images 183 with the axes of lenslets such as 112. To assure that reference edge 181 is the only one that serves this function, panels 184 and 188 are cut with a taper as indicated by the angles 187 and 189, respectively. When the panels are folded, their top edges are all kept in line so that only the reference edge 181 stands proud of the folded booklet. Again, interlaced images 183 are formed in the manner described previously, and it should be clear that they formed parallel to reference edge 181 as well as perpendicular to it so that either the horizontally or vertically displaced views of FIGS. 4a or 5a may be created. Moreover, it is contemplated by the invention that the reference edge 181 and the interlaced images 183 may be at any sensible angle. What is essential is that the reference edge 181 and the interlaced images 183 be in a predictable predetermined angular relationship, which could just as easily be forty-five or sixty degrees, or some other.

Figure 10:
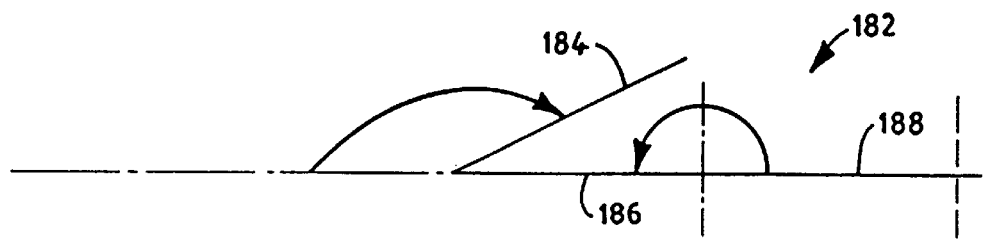
FIG. 10 is a diagrammatic illustration showing how the multipaneled booklet of FIGS. 8 and 9 is folded to achieve the configuration of FIG. 8.

FIG. 10 shows the sequence for folding booklet 182. Panel 184 is first folded on top of panel 186 with a sharp crease formed between them. Then, panel 188 is folded over panel 186, between panel 184 and 186, so that it is sandwiched between them. Again, a sharp crease is formed between these latter two.

It will be understood that tab placement can be adjusted as needed to induce the proper bending moments to cause informational inserts to flatten out against the optics. However, to change the current tab positions would be a very costly proposition which can be avoided with the present invention.

In addition to the need to have the informational inserts flat with respect to the optics, it must also be parallel to the axes of the lenslets to within limits or adverse visual effects can occur in the form of ripples that become visually apparent across the face of the viewed field. What has been found preferable is to keep the interlaced images parallel and perpendicular to the axes of the lenslets to within ½ or less the width of a single segment of an interlaced image resident behind a lenslet over the length of the art work of interest. Consequently, if the art work is long, this tolerance is more demanding than if short. However, what is interesting is that the art work can slide perpendicular to the lenslets without objectionable visual problems; one just sees the different views in different orders. Even so, the tilt must remain within the above limits to avoid rippling. This means that the edges of multiply folded panel inserts must be straight to within this tolerance, or at least one of them used for registration must be straight, while the others may deliberately be skewed in the opposite direction to avoid any conflict in this regard. Interestingly, while the inserts can move in rectilinear fashion transverse to the axes of the lenslets without introducing visual artifacts, so long as any tilt is kept within bounds, edges skewed in the direction opposite that of the reference can provide springiness in the plane of the insert to keep it in place perpendicular to that direction. Otherwise, the effect of slight movement in this plane is to simply change the order in which one sees the different views.

Also, it is to be understood that the various inserts described may be rotated ninety degrees and still work even though the bowing is now also at ninety degrees to those inserts shown.

With respect to the maximum defocus and angular misalignment, the following guidelines have been found useful but can be altered depending on the image content, relationship of dominant areas, and the visual effects that one is willing to tolerate as acceptable.

The maximum defocus is some fraction of a lenslet width and is given by the ratio of the optical thickness, OT, of a lenticulated screen to the number of interlaced images multiplied by some quality factor, f, which is selected based on what is visually tolerable for a particular set of images.

The allowable angular tolerance in radians is simply the ratio of the width of a lenslet divided by its length times the product of the number of images and again some quality factor. For example, if the length of a single line of lenslets is four inches, its width 0.020, there are two interlaced images along either the azimuth or elevational perspectives, and the quality factor is 2, then the allowable angular tilt is 1/14th of a degree.

Figure 12:
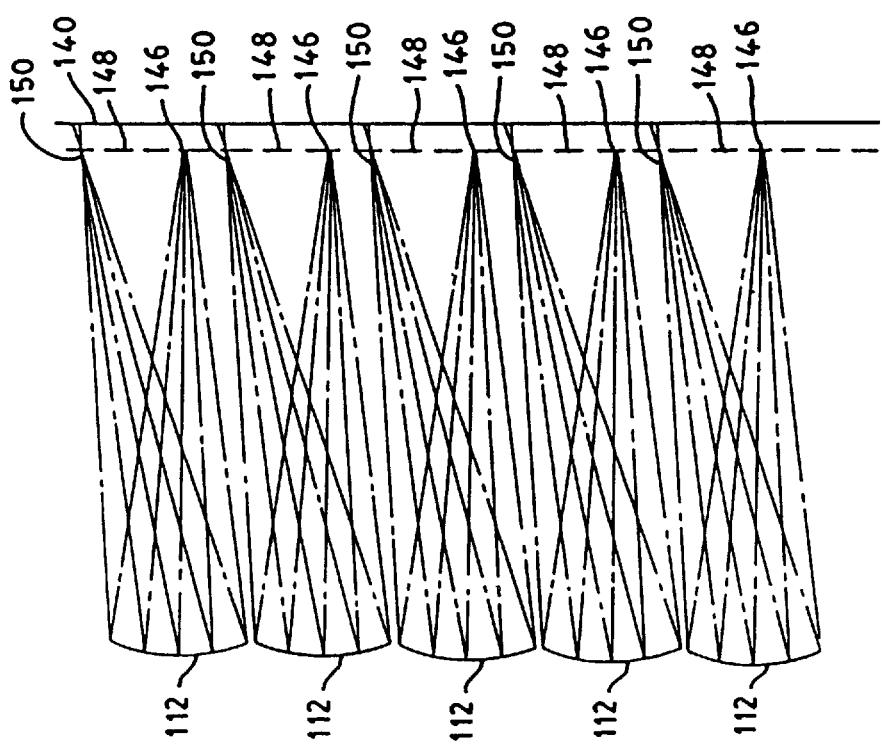
FIGS. 11 and 12 are diagrammatic drawings taken transverse to the axes of panels used in the inventive box systems representing either a vertical or horizontal section taken through a mosaic of lenslets carried on a panel and tracing the paths various light rays take in traveling to different segments of interlaced images formed on information bearing cards used in the inventive box systems.
Figure 11:
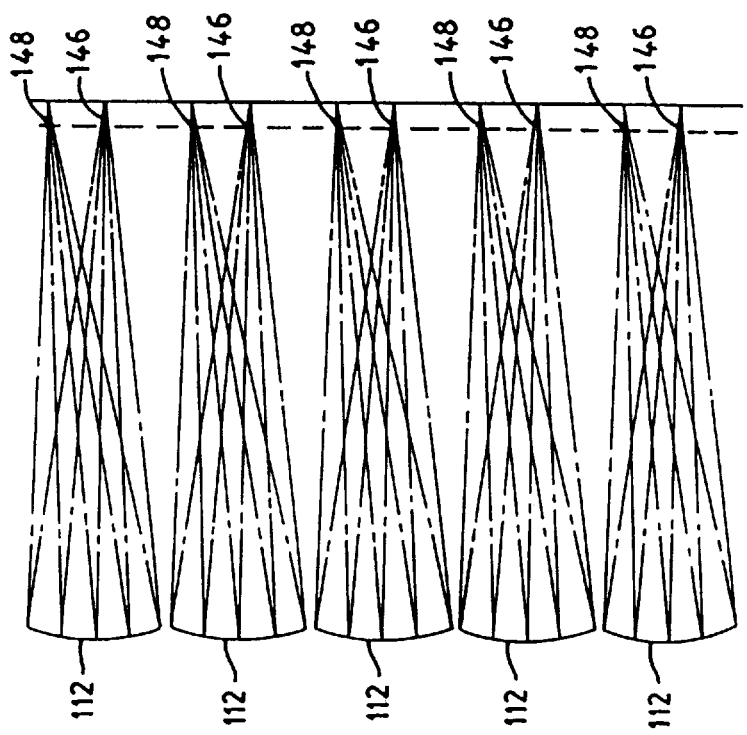

FIGS. 11 and 12 show the principle of operation of the lenticular panels used in the box systems of the invention. Both figures are traces illustrating the paths that certain light rays take in traveling from different portions of the interlaced images used in the invention to provide the different views for a particular lenslet design. The figures show cross-sections of square lenslets for illustration purposes, but it will be understood that the same analysis applies along other transverse sections because of rotational symmetry. Here, the ray traces were done for lenslets 112 that are made of styrene with an index of refraction of 1.59, have a radius of 0.0285 inches, and an apical focal distance of 0.058 inches, i.e., the distance from the front surface on the axis to the optimal focus of a lenslet, here the dashed line which represents the interlaced image. The printed informational insert card actually resides behind this location by a distance of 0.003 inches so that there is an air gap of this amount between the front surface of a card (140) and the dashed line.

In FIG. 11, an observer looking straight along the axis of lenslets 112 sees a different segment of the whole image behind each lenslet 112 where each segment is designated at 146. If the observer looks along a line of sight that is at 10 degrees with respect to the axis, image segments designated at 148, which correspond to a different image, can be seen while those designated at 146 cannot, which provides the mapping concept referenced earlier.

In FIG. 12, image segments 150 are seen at an angle of observation inclined to the axis at 20 degrees so this may represent yet another message or a repeat of a previous message slightly shifted.

Figure 13:
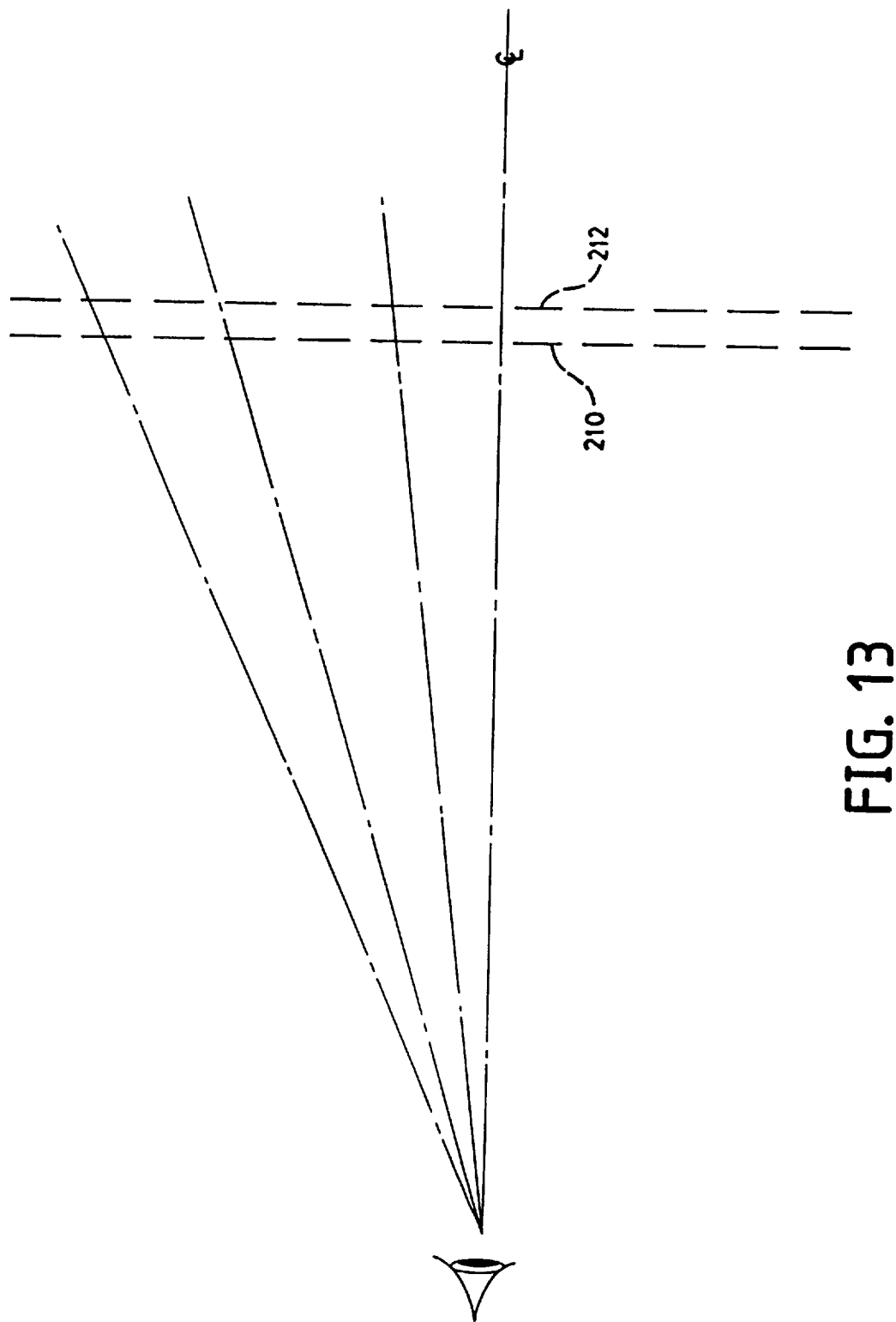
FIG. 13 is a diagrammatic view illustrating the nature of parallax effects that are corrected by certain features of the invention.

Reference is now made to FIG. 13, which illustrates the parallax effect that can occur in using the invention if the size of the actively imaging lenticulated surface becomes large in relation to the interpupillary distance of the eye, or the viewing distance is correspondingly small in relation to the overall image size. The parallax effect comes about because of a displacement of the chief ray passing through the center of each lenslet with respect to its corresponding image segment as the angle of observation of a lenslet increases compared with the normal to that lenslet. The result is that every chief ray, if not corrected for this effect, passes through an incorrect interlaced image segment. The visual result is a softness or blurriness in changing from one view to the next or poor separation between views. The phenomenon is shown heuristically in FIG. 13. Let 210 represent the lenslets with a given spacing (assume thin lens theory applies) and 212 represent the interlaced images at the same spatial frequency of the lenslets. Here, the dashes for the interlaced images in 212 can comprise just one image or several images in the allocated space. For purposes of the illustration, they can be assumed to represent one image segment, but the argument also applies if they represent more than one.

As can be appreciated, the lenslets and images line up perfectly just like one picket fence behind another, and when one looks through a lenslet normal to it (the lenslets are transparent), one sees a corresponding image segment right behind it. However, when viewing 212 at some finite distance and angle other than normal incidence, it is clear that one no longer sees the proper corresponding image segment. Instead, the line of sight begins to walk away from the proper image segment as the viewing angle increases until the proper image is missed altogether. This results in a partial view of both images simultaneously, a generally undesirable result.

Figure 14:
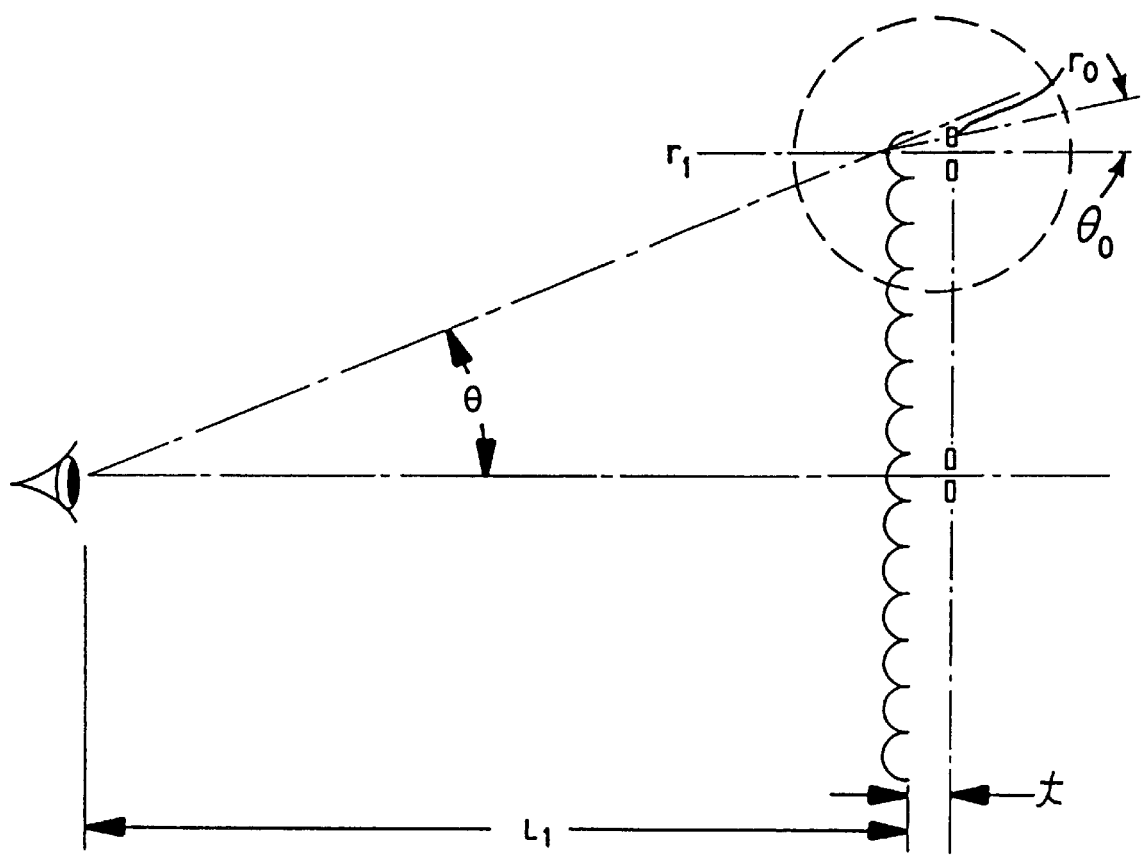
FIG. 14 is a diagrammatic illustration showing in more detail how the parallax effects of FIG. 13 occur as a result of differences in the angle of perspective from which an observer "sees" different segments of interlaced images of the invention.
Figure 15:
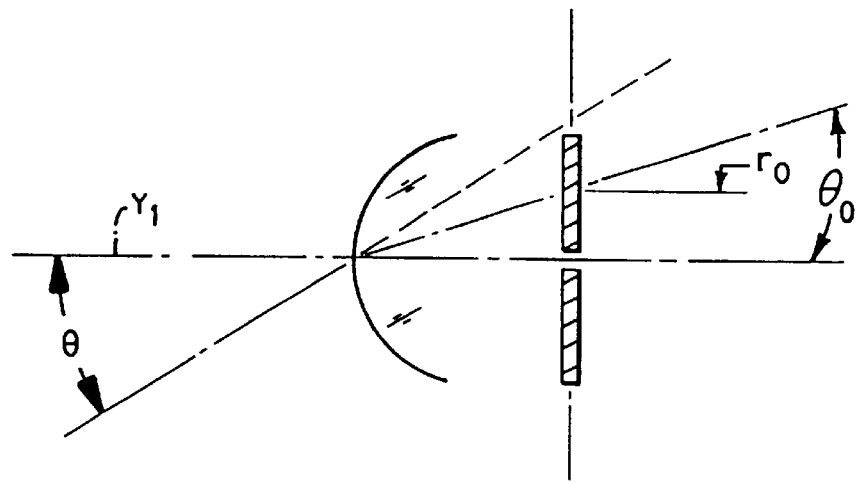
FIG. 15 is a diagrammatic illustration showing the origins of a visual parallax effect that exists without the corrective features of the invention.

FIGS. 14 and 15 show in more quantitative terms exactly the amounts by which the chief ray "walks-off". More particularly, let $r_0$ be the ray height of the chief ray for any lenslet as a function of the angle of observation, $\theta$, (could also be $\phi$) and vertical position of the r-intercept of an incoming ray. Then $\theta_0 = \theta/n$, where n is the index of refraction of the lenslet material and $L_1$ is the viewing distance. Then, $$r_0 = r_1(1+(t/n)/L_1)$$

If one lets, $f_0$ = the spatial frequency of the interlaced images, then to compensate for the progressively larger errors in $r_0$ with increasing viewing angle, $f_1$, the spatial frequency of the lenslets is given by:

$$f_1 = f_1(1+(t/n)/L_1)$$

Thus, the parallax effect may be compensated for exactly for any assumed viewing distances or optimized over a range of viewing distances.

While the preferred way of correcting for parallax effects is to increase the spatial frequency of the lenslets in two orthogonal dimensions, to progressively drop the center of each lenticule downwardly with increasing angle, it is to be understood that the spatial frequency of the artwork may also be adjusted or both can be altered to address the parallax problem. However, it is somewhat easier to build the correction into the molding tool and use available printing techniques to achieve the spatial frequency of the interlaced images.

Figure 16:
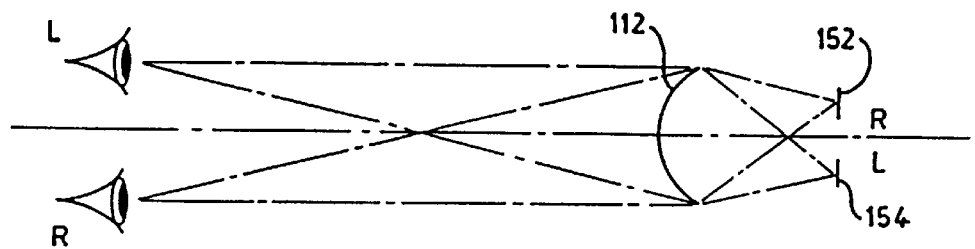
FIG. 16 is a diagrammatic plan view illustrating the principle of operation of the lenslets surfaces of the invention.

FIG. 16 diagrammatically shows how the interlaced images and lenslets may be used to provide stereo image sets, such as stereo pairs, so the view of the box system front cover or other display may be a stereo image. Here, the system is arranged so that the left eye sees a left stereo image segment behind the right side of a lenslet 112 while the right eye sees a right stereo image segment behind the left side of a lenslet 112 (Note: The illustration is for only one plane but is to be extended by rotational symmetry to all cross-sections). The overall effect is for the right and left eyes to have presented to them full left and right stereo image pairs. Here, again, parallax effects can be corrected in the manner previously described.

It will also be recognized that multiple 3D images are contemplated through the use of multiple interlaced stereo images.

Figure 17:
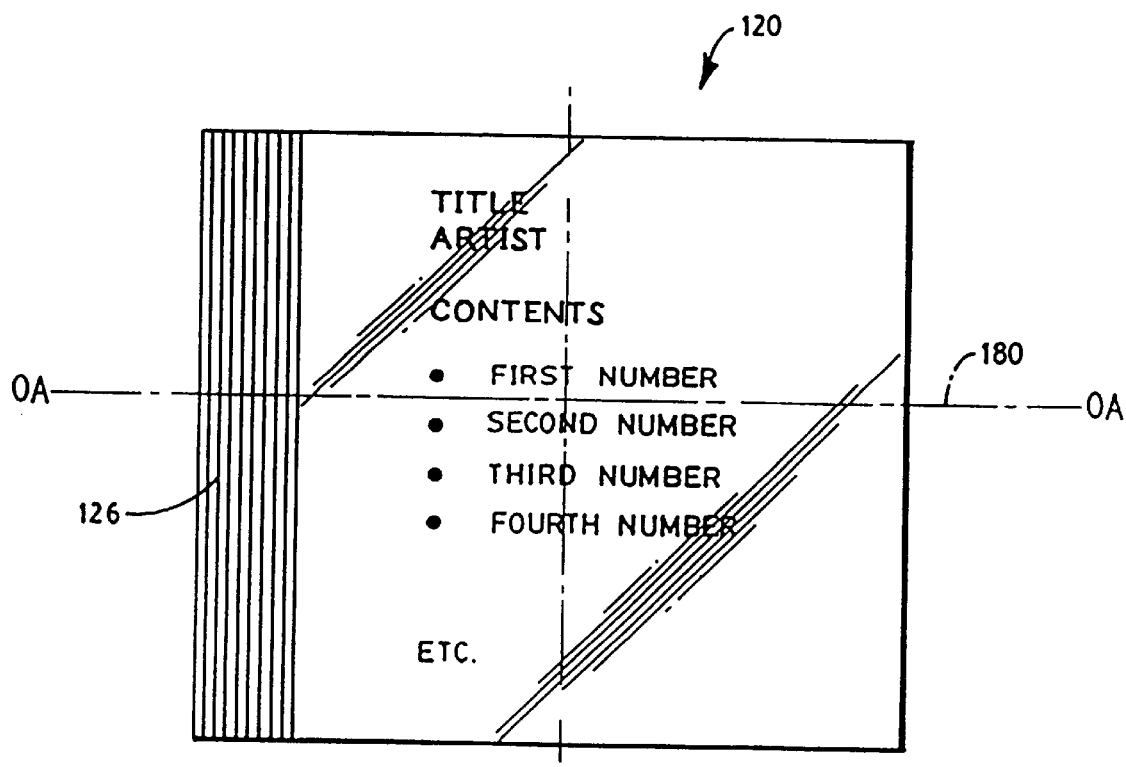
FIG. 17 is a diagrammatic front elevational view of the box system of FIGS. 4 and 5 shown with additional elements to illustrate the importance of alignment of printed inserts with the axes of the mosaic surfaces of the invention.

FIG. 17 further illustrates the importance of proper alignment of the informational content of the card with the axes of the lenslets used in the invention. If one axis is taken to correspond to the horizontal axis, OA, of a lenslet, then reference edge 181 (FIG. 9) is preferably positioned parallel to it to achieve proper alignment within the tolerances provided in the previous discussions regarding tolerance guidelines. This would be true for the orthogonal axis of a lenslet running vertically rather than horizontally as shown. Again, angular orientations other than parallal or perpendicular are beneficial and are within the scope of the invention.

Referring now to FIGS. 18–21, there is shown a novel compact disc holder 200 for use in properly locating printed inserts with respect to the lenticular focal plane of the boxes of FIGS. 4 and 5. As will be seen, disc holder 200 is provided with a plurality of flexible arms that act as lifters to resiliently urge a printed insert into the desired alignment with the focal plane while still being suitable for use with conventional high-speed assembly equipment.

As will be seen from the figures, compact disc holder 200 functions to retain an insert card flush with the rear surface of rear base flat panel 110 or 132 and to retain a compact disc in place. For these purposes, disc holder 200 comprises a circular tray section 202 with a flexible hub 204. Extending above circular tray section 202 are four raised edge sections, 206, 208, 210, and 212, located at the four corners of disc holder 200 and shaped to provide a rim for protecting the peripheral edges of a compact disc.

Each raised edge section, 206–212, includes raised dimples (only two shown), such as those at 214 and 216, that are adapted to be snap-fitted with corresponding tab section detent holes, 56–62, such as those shown in the conventional rear base 22. In this manner disc holder 200 snaps into and is retained in a rear base of conventional design.

A CD is held in place by disc holder 200 with its recorded information bearing surface against the front surface of circular tray 202 so that it is protected against damage. To accomplish this, a user simply aligns flexible hub 204 with circular hole 88 and then pushes against compact disc 28 until it compresses the flexible fingers of hub 204 inwardly. Further inward pressure causes the flexible fingers by design to expand after certain portions clear the thickness of a CD to trap disc 28 in place.

Disc holder 200 also includes a rectangularly shaped raised deck 218 that protrudes through front cover 102 or 122 near the hinge edge. The deck is usually provided with surface serrations extending along its longitudinal direction to provide a grip for ease of handling by the user and during manufacture.

Figure 18:
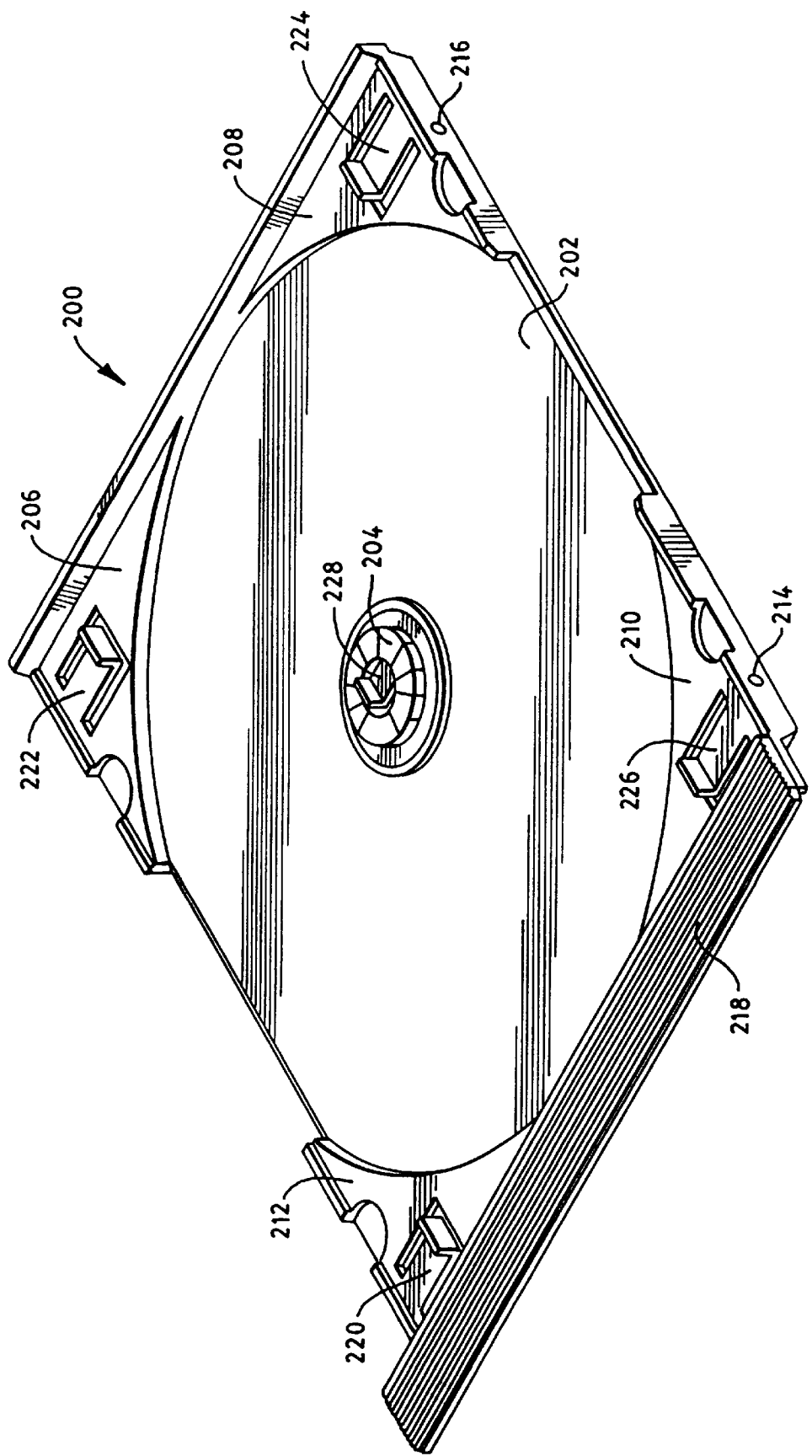
FIG. 18 is a diagrammatic, perspective view of a disc holder provided with resilient fingers to urge a printed insert, such as a booklet, into registration with the focal plane of a panel mosaic of the invention.

As best seen in FIG. 18, each of the raised edge sections (206–212) is provided with a flexible arm designated at 222–226, respectively. Each flexible arm (222–226) resides in a corresponding rectangular shaped hole in a corresponding raised edge section and comprises as horizontal section 230 and a vertically extending tab section 232 as shown typically in FIG. 21. The flexible arms are each preferably structured so that, when such holders are stacked on top of one another, the flexible arms are pushed beneath the surfaces of their corresponding raised edge section but not beyond the bottom surface of the disc holder 200. This enables the use of standard assembly equipment for high-speed operation.

At the center of flexible hub 204 there is provided yet another flexible arm 228 of similar construction. Arm 228 similarly retracts flush for ease of use with assembly equipment and is optional depending on the properties of the printed inserts with which it is used. Obviously, stiff, thick inserts would be less apt to require its use than thin, flexible inserts. In any event, arm 228 is preferably formed as an integral part of one or more of the rosettes of central flexible hub 204.

Figure 21:
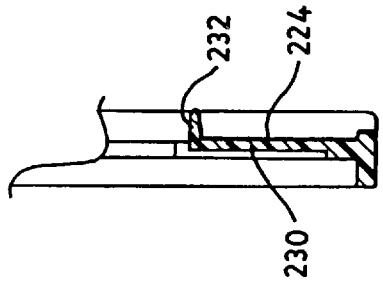
FIG. 21 is a diagrammatic, sectional elevation of a portion of the disc holder of FIG. 19 taken generally along lines 21—21 thereof.
Figure 19:
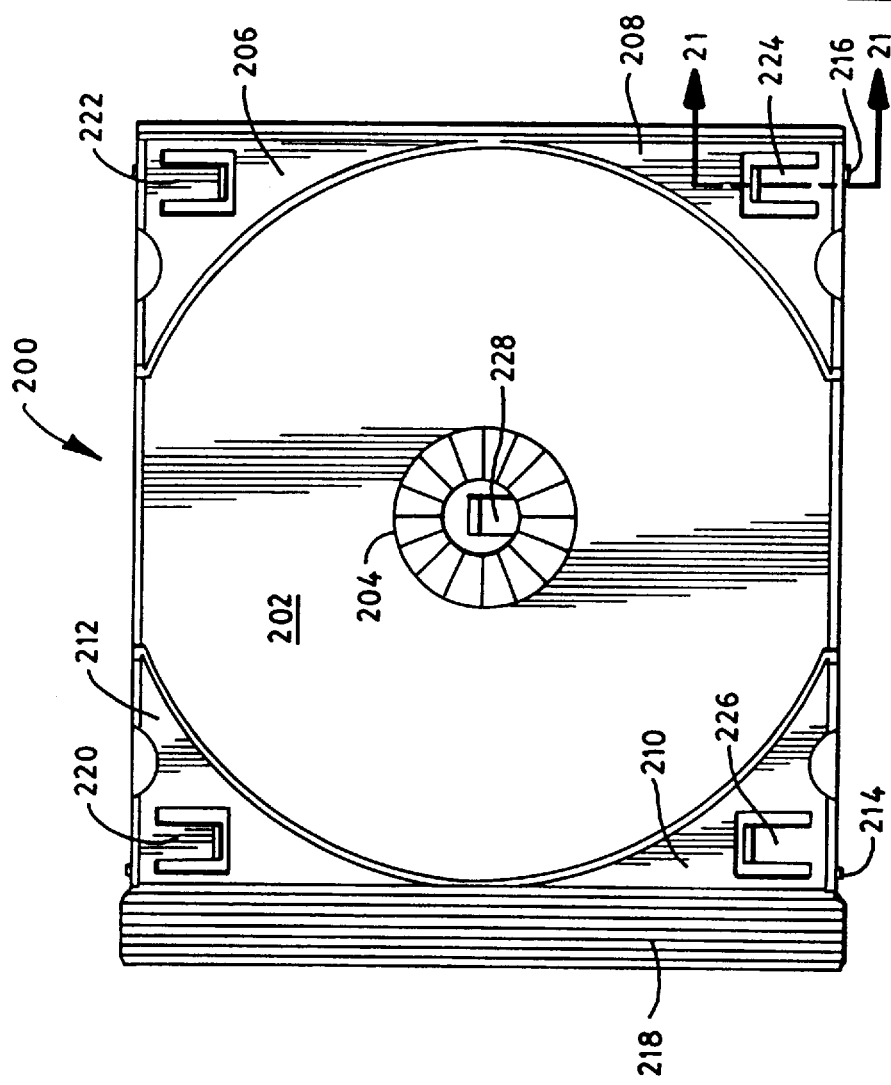
FIG. 19 is a diagrammatic plane view of the disc holder of FIG. 18.
Figure 20:
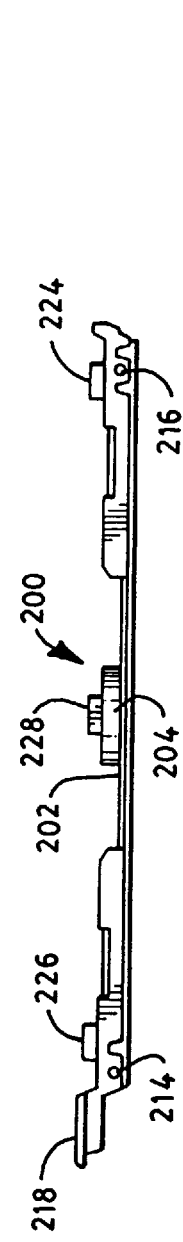
FIG. 20 is a diagrammatic elevational view of the disc holder of FIG. 18.
Figure 22:
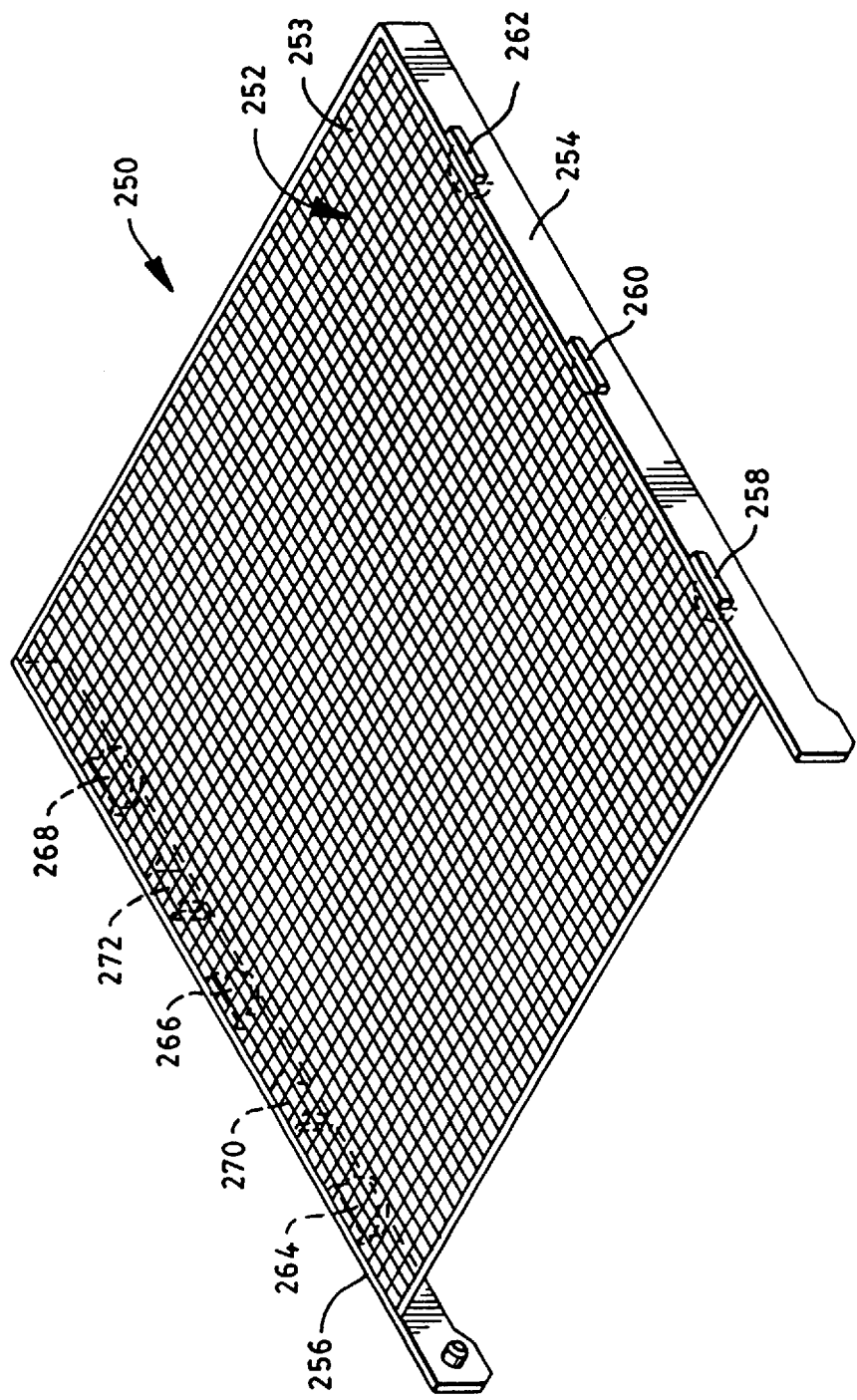
FIG. 22 is a diagrammatic, perspective view of a front cover of the box systems of FIGS. 4 and 5 showing resilient fingers for urging a printed insert against a reference line or a shallow side wall of a box for aligning the interlaced images of a printed insert with respect to the axes of the lenslets of the mosaics of the invention.
Figure 32A:
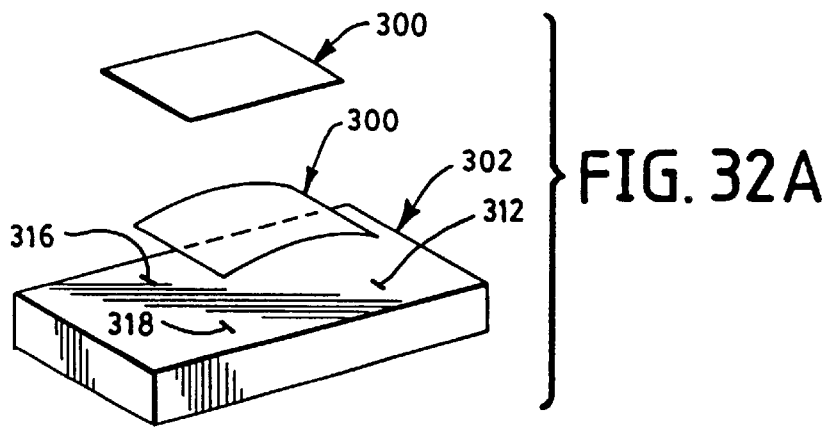
FIGS. 32(a) through 32(e) are a series of diagrammatic, perspective views of an alternative embodiment of the invention showing how an inventive flexible, panel provided with a mosaic of lenslets can be clipped to a surface of a container which carries interlaced images printed on it.
Figure 32B:
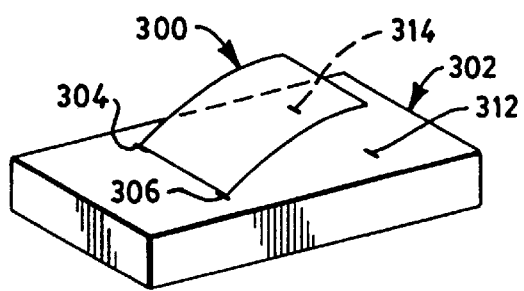
Figure 32C:
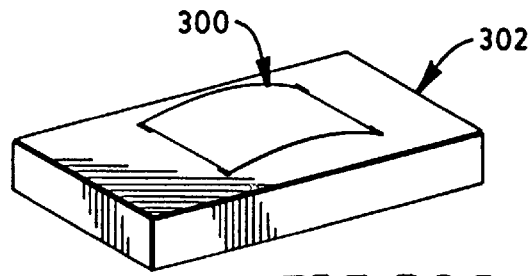
Figure 32D:
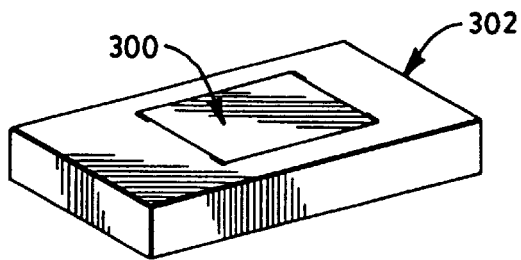
Figure 32E:
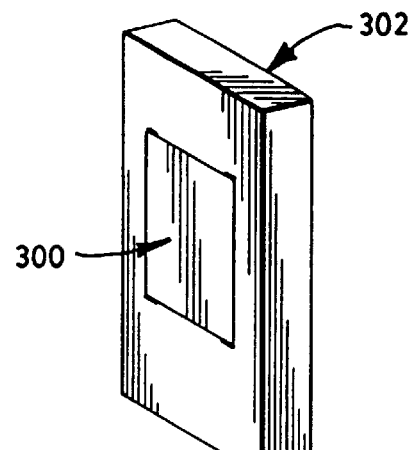

As best seen in FIG. 21, the height of vertical tab section 232 is dimensioned so that it positively urges a printed insert into the desired focal plane of the lenslets. In practice, this would depend on selecting the dimension that is appropriate for the minimum thickness for the range of anticipated printed inserts to be encountered in use.

With respect to the angular alignment of an insert in using the disc holder 200, one preferred way is to dimension the width of the printed inserts to that the clearance provided between their references edges 181 (FIG. 9) and the interior surface of the front cover shallow side walls is everywhere less than the allowed departure from parallelism over the length of the longer of the printed interlaced images. This approach would thus rely on fit between the side walls of the front cover and the width of a printed insert. As will be seen, there are other possibilities to be discussed.

Referring now to FIGS. 22–25, there is shown a novel front cover 250 that is provided with features for aligning printed material through the use of flexible tabs for both alignment with respect to the focal plane of lenticulated panels and proper angular alignment between the axes of the interlaced images and the individual lenslets. Here, the clearance between the width of the printed inserts need not be tight because flexible members resiliently urge the insert into the desired alignment.

Front cover 250 includes a lenticulated panel 252 having formed thereon a plurality of regularly spaced lenslets 253 in mosaic fashion and a pair of opposed, shallow side walls 254 and 256. In side wall 254, there are provided three flexible tabs 258, 260 and 262 which are generally parallel to lenticulated panel 252, although aimed slightly downwardly, and in side wall 256, there are also three flexible tabs 264, 266, and 268 of similar construction. Also, in side wall 256 there are provided a pair of flexible arms 270 and 272 for side loading a printed insert against a reference line in side wall 254 defined by a pair of spaced apart bosses 274 and 276 against which reference edge 181(FIG. 9) seats for angular alignment.

As best seen in FIGS. 26 and 27, a tab such as that at 268 has placed underneath it a portion of a printed insert as shown in FIG. 27. Because tab 268 is flexible, it holds the edge of the insert firmly against the focal plane of the lenslets and tends to otherwise flatten the central portions to bring them within acceptable tolerances for focus. If the central portion of the inserts sags because thin flexible inserts are anticipated, it is possible to use this scheme in combination with a flexible arm such at that at 228 in the hub 204 of disc holder 200 in FIG. 18. Alternatively, thicker, stiffer material may be used.

FIGS. 28 and 29 show the side loading action of flexible arms 270 and 272. As will be noticed, a slight undercut 274 is provided so that an insert cannot inadvertently slide underneath the arms and defeat their side loading function. Such arms could also be used in conjunction with the flexible lifter arrangement of FIG. 18 for focal plane alignment, and the fit approach discussed in connection with angular alignment in FIG. 18 could alternatively be used with the flexible tab approach advocated here.

It should be clear that front cover 250 could with minor modification be used as a stand alone display box for purposes of the invention, and it is intended that it be so considered. Simple removal of the pivots and the provision of a mounting hole, for example, accomplishes this.

FIG. 30 shows how embossing can be used in connection with the printed insert itself to provide alignment functions. As shown there, a printed insert 280 is provided with four embossed sections 282–288, which are formed in well-known manners. The embossed sections are dimensioned and positioned so that they fit in the space between corresponding front cover tabs, which, as mentioned previously, is about 0.090 inches. This is best seen in the sectional view of FIG. 31. Obviously, this approach to focal plane alignment would work best with stiff printed inserts, but could be used with the central lifter of FIG. 18 for added assurance. In addition, the angular alignment can be controlled by fit ,as before, or the side loading scheme of FIG. 22 may beneficially be employed.

FIGS. 32a–e show in sequence how a flexible lenticulated panel 300 carrying two-dimensional lenslets as above may be connected with a specially configured box or display 302 on which are printed interlaced images. Here, box 302 may be for containing general merchandise, cereal, audio or video tapes, for example, or may simply be used as an otherwise empty pictorial display frame. Exemplary examples would include VHS cassette boxes or multiflapped CD holders where one flap represents the contents of the holder. What is essential is that one or more surfaces of such a box, or any surface for that matter, have interlaced images printed on it along with the corresponding registration holes.

Figure 34:
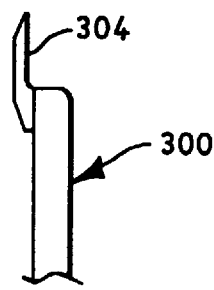
FIG. 34 is a diagrammatic, sectional view of one of the clips of the panel of FIG. 33 taken generally along line 34—34 thereof.
Figure 33:
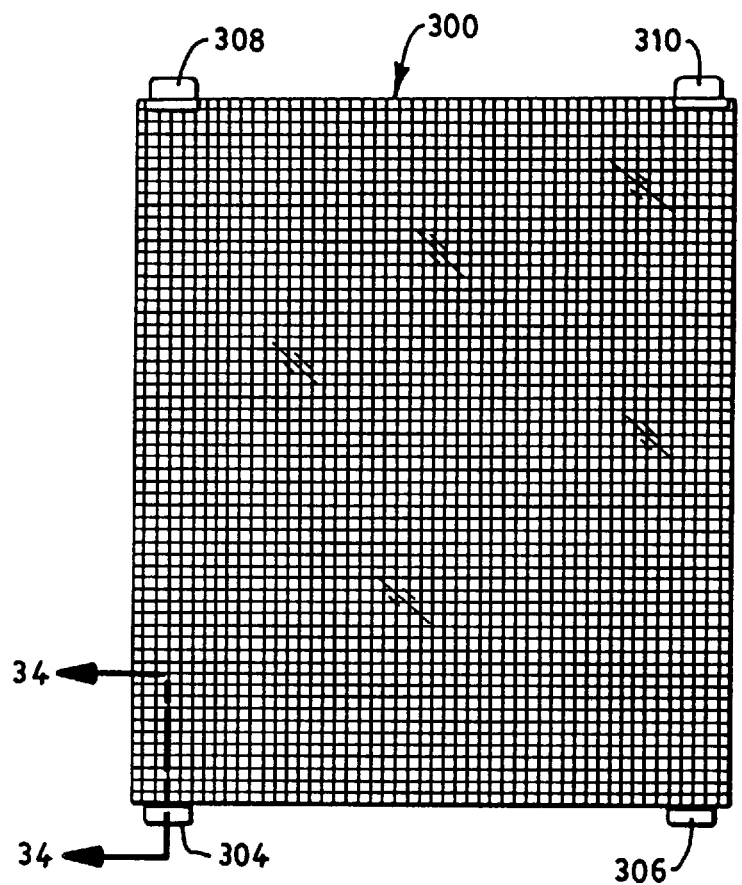
FIG. 33 is a diagrammatic, plan view of the flexible panel of FIG. 32 showing a clipping arrangement that cooperates with receiving holes in the box of FIG. 32 to align the lenslets of the panel mosaic with the interlaced images printed on the box.

As best shown in FIGS. 33 and 34, the flexible, lenticulated panel 300 is provided with four flexible clips 304–310 that insert into corresponding holes 312, 314, 316, and 318. The holes and the clips are dimensioned in the plane of the image carrying surface so that the angular alignment meets the criteria previously discussed. For a four inch long lenslet array, other things being as for previous examples, the linear offset between the longitudinal axes of the interlaced images and the lenslets would be about 0.005 inches and as much as 0.010 inches over the four inch length, which could also be measured with respect to the interlaced image length where the lenslet array length was longest. These tolerances can be met by die cutting the required holes and injection molding the clips to the desired precision.

Also, the length between clips is dimensioned so that there is a slight interference between the outer edges of the holes and the outer surfaces of the clip so as to force angular alignment. However, care must be taken to assure that the interference is not so much that it tends to bow the lenticular screen 300. Otherwise, it will not lie flat against the interlaced images.

In this connection, one of the clips may be foreshortened to that only three come into play for alignment purposes thus making the arrangement kinematic since there are no redundant forces competing in the alignment arrangement.

In the foregoing manner there is provided a flexible transparent plate having a lenticulated surface with a focal plane and a plurality of adjacent lenslets. The clips are positioned on the flexible transparent plate to fit into registration holes when the flexible transparent plate is bowed and attach the flexible transparent plate to the image bearing box surface so that the focal plane of the lenticulated surface overlies the printed interlaced images and the axes of the interlaced images are aligned parallel or perpendicular as the case may be to within a predetermined fraction of the width of one of the lenslets over the longest length of the lenticulated section to provide distinctly different information from different angular perspectives of the transparent lenticulated section.

Figure 35:
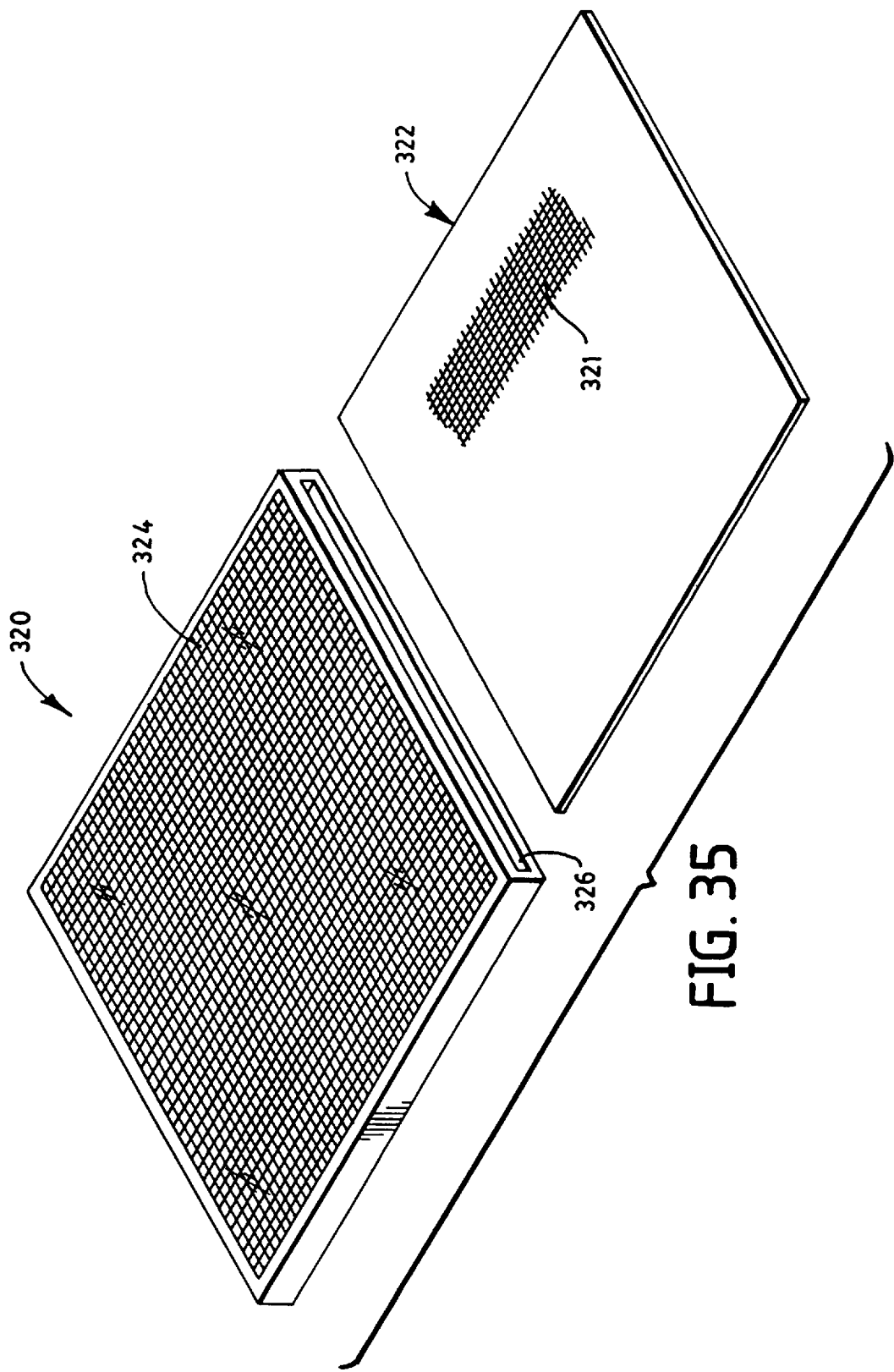
FIG. 35 is a diagrammatic, perspective view of yet another embodiment of the invention showing an image display frame with a mosaic of lenslets in combination with a printed insert therefor.

FIG. 35 shows yet another inventive arrangement for the display of sporting figures, celebrities, popular performers, or family members and the like. Here, a display box 320 is provided in the usual way of the invention with a lenticulated panel 324 comprising a two-dimensional array of lenslets. In box 320, there is formed by any well-known manner, an elongated slot 326. A printed card 322 is provided in accordance with the teachings of the invention and has formed on it the necessary interlaced images 321 and reference edges. Slot 326 and printed card 322 are dimensioned in accordance with alignment requirements of the invention so that the fit between them dictates that printed card 322 reside within the depth of focus of lenticulated panel 324 and is otherwise angularly aligned properly.

Aside from tightly held tolerances to provide a snug fit between a printed insert and its supporting structure with respect to the lenticulated panel 324, looser tolerances may be employed. This may be done by dimensioning the width so that there is a loose fit widthwise between insert 322 and slot 326. In this approach, one edge of insert 322 may then be aligned with one side of slot 326 to angularly align the axes of the interlaced images and the lenslets. Simply physically tapping the edge display box 320 along one of its edges will accomplish this. Afterwards, insert 322 may be fixed in place by ultrasonically welding it to one of the surfaces of box 320, preferably. Alternatively, uv-curable epoxy may be used along the open edge of slot 326.

Box 320 is preferably molded in a clam shell configuration with a living hinge and well-known automatic attachment features which permit both sides of it to snap together to automatically form slot 326 between them. Also, it is contemplated that both exterior surfaces of box 320 may be provided with lenslets in conjunction with both sides of insert 322 being provided with interlaced images so that either box side may project multiple or stereo images. In addition, the tolerances of box 320 and insert 322 are preferably set so that one insert 322 may be exchanged for another with different images.

Figure 36:
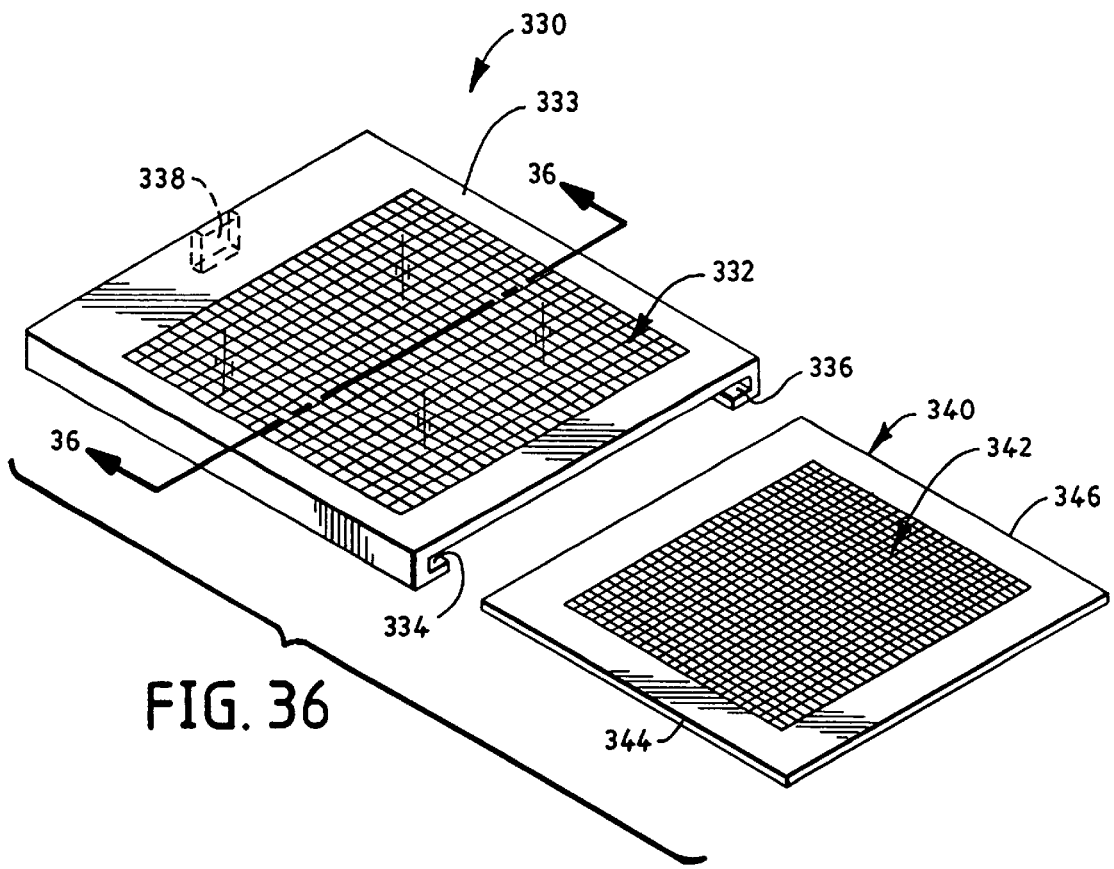
FIG. 36 is a diagrammatic, perspective view of still another embodiment of the invention showing an image display frame with a mosaic of lenslets on only one side in combination with a printed insert therefor.
Figure 37:
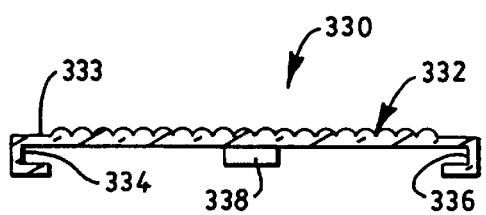
FIG. 37 is a diagrammatic, sectioned elevational view of FIG. 35 taken generally along line 36—36 thereof.

Reference is now made to FIGS. 36 and 37 which show a display embodiment of the invention that has but one lenticulated surface carrying a plurality of lenslets arranged in a regular two-dimensional array or mosaic. Here, the display frame is designated as 330 and is seen to comprise a lenticulated front panel 332 which does not cover its entire front surface 333, so there is some portion of surface area 333 that can be used for other display purposes such as a logo or business or trade name, or the like.

Extending from front surface 333 are a pair of opposed channels 334 and 336 for receiving a printed insert carrying interlaced images. Such an insert is designated at 340 which carries lenticulated images shown at 342. As seen, printed insert 340 also has edges 344 and 346 that snugly fit into grooves 334 and 336. The width between grooves 334 and 336 and the width and thickness of insert 340 are toleranced to properly align interlaced images with respect to lenticulated panel 332. A stop 338 is also provided to locate insert 340 along the length of channels 334 and 336.

Figure 38:
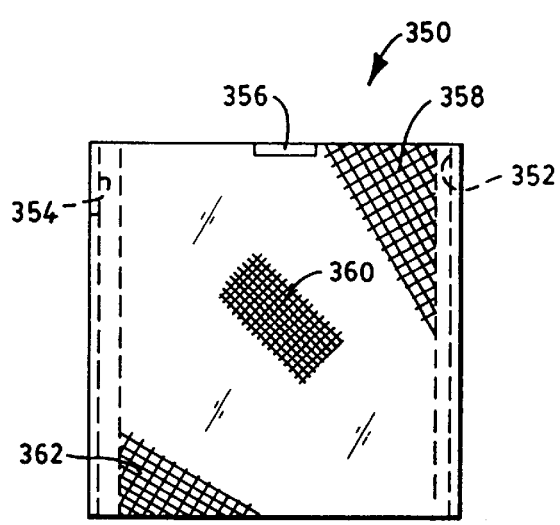
FIG. 38 is a diagrammatic, front elevational view of yet another embodiment of the invention illustrating that reference locating surfaces of displays, boxes, and printed inserts of the invention need not be parallel or perpendicular to the axes of mosaic lenslets but only in a fixed orientation with respect to them.

FIG. 38 shows another variation of a display such as 330. Here, a display 350 is again provided with spaced apart channels 352 and 354 and a stop 356. As before, the fit of an insert card with respect to channels 352 and 354 establish the alignment between lenslets and interlaced images. However, this embodiment differs from preceding embodiments because it illustrates the principle that the lenticlated grooves and interlaced images need not be in a parallel or perpendicular in orientation with respect to the dominant geometry but, rather, need only be in a predetermined orientation. For example, lenslets 358 are at thirty degrees with respect to the vertical in FIG. 38, lenslets 360 are at forty-five degrees, and lenslets 362 are at sixty degrees.

Such rotated or tilted lenslets provide the opportunity to offer customized and proprietary artwork and lenses to differentiate customers. Clearly, boxes or displays designed to work at forty-five degrees can't "read" or "decode" printed inserts designed to work at other angles such as thirty or sixty degrees.

In addition to the orientation of the lenslets with respect to other reference features of displays, boxes, and printed materials, it is also contemplated, along with lenslet orientation, that the spatial frequency of the lenslet can be made different for different angular orientations to provide any number of combinations. For example, lenslet frequencies of 50, 60, 72, and 75 lenslets per inch combined with lenslet angular orientations of 0, 15, 30, 45, 60, 75, and 90 degrees result in 28 different possible combinations. For other sensible combinations, it is estimated that there are in excess of 100 possible combinations.

It should also be understood that it is not necessary to form the lenticulated wall sections of the invention as unitary structures integrated with structural walls themselves since it is within the teaching of the invention to attach separately formed lenticulated wall sections to otherwise smooth wall sections by using suitable adhesives or other means of attachment. Moreover, it will be understood that the lenticulated structures of the invention, including compensation for parallax effects, may be integrated with the front, back, and side wall surfaces along with interior surfaces, such as disc carriers, as well. In addition, it should be realized that the flexible lifters and side arms for resiliently urging printed inserts into their alignment positions with respect to the focal plane and longitudinal axes of the lenslets need not be confined to use in just jewel box configurations since it is entirely possible to incorporate them into base or front covers or the like rather than disc holders. Moreover, it will be recognized that lenslets may be arranged at any angle with respect to a reference line or surface since all that is required in this connection is to have the interlaced images rotationally aligned with respect to the axes of the lenslets. In this connection, the printed materials need not be perfectly rectilinear; what is essential is that they be of predetermined geometry and thickness and weight. Consequently, it is entirely within the scope of the invention to have lenslets oriented at, say, forty-five degrees with respect to a box or display side.

Those skilled in the art may make other changes to the invention without departing from the scope of its teachings. Therefore, it is intended that the embodiments described herein be considered as illustrative and not be construed in a limiting sense.

What is claimed is:

1. A system for displaying visual information, said system comprising:

information bearing media of predetermined geometry and thickness, said information bearing media having printed on a surface thereof as an array of two-dimensional image segments a plurality of interlaced images and having one edge that serves as a reference edge and has a given angular orientation to within a given tolerance with respect to said interlaced images;

at least one wall having at least one major dimension, said wall having at least one transparent lenticulated section optically associated therewith, said transparent lenticulated section having arranged thereon a plurality of lenslets arranged in a two-dimensional array and whose foci collectively substantially reside in a focal plane and have a given depth of focus; and means for releasably holding said information bearing media with respect to said wall so that said information bearing media is located in a position of contacting alignment with respect to said transparent lenticulated section such that said interlaced images are located within said depth of focus of said lenslets and said reference edge is in said fixed angular orientation, within a predetermined fraction of the width of one of said lenslets over a predetermined length of said interlaced images, with respect to said lenslets so that an observer of said transparent lenticulated section is provided with distinctly different information when viewing said transparent lenticulated section from different angular perspectives, said two-dimensional array of lenslets arranged on said transparent lenticulated section being selectively progressively offset with respect to one another in two-dimensions to correct for visual parallax effects that would otherwise be apparent to an observer when viewing said transparent lenticulated section from a finite viewing distance.

2. The system of claim 1 wherein said holding means comprises flexible sections for resiliently urging said information bearing media into alignment with respect to said transparent lenticulated section.

3. The system of claim 1 wherein said holding means comprises a pair of spaced apart channel sections dimensioned with respect to said predetermined geometry and thickness of said information bearing media to provide a snug fit therewith for purposes of aligning said interlaced images with respect to said transparent lenticulated section.

4. The system of claim 1 further including another wall opposed to said one wall and a pair of shallow side walls which in combination with said opposed walls define a slot therebetween for receiving said information bearing media, said slot being dimensioned with respect to said predetermined geometry and thickness of said information bearing media to provide a snug fit therewith for purposes of aligning said interlaced images with respect to said transparent lenticulated section.

5. The system of claim 4 wherein both of said opposed walls include lenticulated sections and said information bearing media comprises printed interlaced images on opposed surfaces thereof for providing different views on both sides of said system.

6. The system of claim 1 wherein said lenticulated section is comprised of portions having different angular orientations with respect to one another.

7. The system of claim 1 wherein said lenticulated section and the interlaced images of said information bearing media have portions that are at angular orientations with respect to other portions.

8. The system of claim 1 wherein all of the walls of said system are molded of transparent plastic and said lenslets are formed on a front surface thereof.

9. The system of claim 1 wherein said lenslets are in form truncated spheres.

10. The system of claim 9 wherein said truncated spheres have cross-sectional shapes selected from the group consisting of squares, rectangles, hexagons, and triangles.

11. The system of claim 1 wherein said lenslets are regularly arranged in said two-dimensional array.

12. A box system for displaying visual information, said box system comprising:

a multi-sided box having at least one surface bearing an array of printed two-dimensional interlaced image segments and having formed therein a plurality of registration holes that are positioned in a predetermined relationship with respect to said array of printed two-dimensional interlaced image segments; and a flexible transparent plate having a lenticulated surface with a focal plane, a plurality of adjacent lenslets arranged in a two-dimensional array, and a plurality of clips, said clips being positioned on said flexible transparent plate to fit into said registration holes when said flexible transparent plate is bowed and to attach said flexible transparent plate to said lenticulated surface when said flexible transparent plate is relaxed so that said focal plane of said lenticulated surface overlies said array of printed two-dimensional interlaced image segments in a fixed angular relationship, within a predetermined fraction of the width of one of said lenslets over a predetermined length of said lenticulated surface, so that an observer of said transparent lenticulated surface is provided with distinctly different information when viewing said transparent lenticulated surface from different angular perspectives, said plurality of adjacent lenslets arranged on said flexible transparent plate being selectively progressively offset with respect to one another in two-dimensions to correct for visual parallax effects that would otherwise be apparent to an observer when viewing said lenticulated surface from a finite viewing distance.

13. The box system of claim 12 wherein said flexible transparent plate is molded of plastic and said lenslets are formed on a front surface thereof while said clips extend from a rear surface thereof.

14. The box system of claim 13 wherein said focal plane is located substantially at said rear surface.

15. A box system for containing at least one flat object and providing visual information about the flat object, said box system comprising:

a multisided flat box comprising a pair of opposed flat walls interconnected by a plurality of shallow side walls to provide an interior chamber for the flat object, said pair of opposed flat walls and said plurality of shallow side walls being joined to releasably receive the flat object, at least one of said pair of opposed flat walls having a transparent lenticulated section composed of a plurality of lenslets arranged in a two-dimensional array and having a focal plane optically associated therewith;

a compliant insert bearing at least two interlaced preprinted images composed of an array of two-dimensional image segments, said compliant insert being removably insertable into said interior chamber and located in a plane substantially parallel and proximate to said focal plane of said transparent lenticulated section so that said interlaced preprinted images are in optical registration and physical contact therewith, said compliant insert being further located substantially in said focal plane of said transparent lenticulated section to provide different information to an observer looking at said transparent lenticulated section from different angular perspectives, said plurality of lenslets being selectively progressively offset with respect to one another in two dimensions to correct for visual parallax effects that would otherwise be apparent to an observer when viewing said transparent lenticulated section from a finite viewing distance.

16. The box system of claim 15 wherein said compliant insert comprises a multi paneled, preprinted sheet folded with creases formed between folds so that it is resiliently urged against said transparent lenticulated section such that it is substantially flat with respect thereto when inserted into said interior chamber.

17. The box system of claim 16 wherein said panels of said multi folded preprinted sheet are of different lengths so that, when folded, at least one of said panels interferes with the crease formed between two others to create a bow in said insert there by making it resilient.

18. The box system of claim 16 wherein said panels of said preprinted sheet are coated on one side to cause them to curl towards said coated side to provide said compliant insert with resilient characteristics when said panels are folded with their coated sides facing one another.

19. The box system of claim 16 wherein said panels of said multi folded preprinted sheet are folded with gentle creases so that when said compliant insert is free standing, said gentle creases tend to cause said panels to unfold thereby providing said compliant insert with said resilient characteristics.

20. The box system of claim 15 wherein said opposed flat walls and said shallow side walls are molded of transparent plastic and said transparent lenticulated section is integrally molded with one of said opposed flat walls thereof.

21. The box system of claim 15 wherein said transparent lenticulated section is formed on the exterior surface of one of said opposed flat walls.

22. The box system of claim 15 wherein said transparent lenticulated section is formed on the interior surface of one said opposed flat walls.

23. The box system of claim 15 where in said plurality of lenslets of said lenticulated section are spaced to compensate for parallax effects.

24. The box system of claim 23 wherein said plurality of lenslets of said lenticulated section have a spatial frequency that is higher than that of said interlaced preprinted images along at least one predetermined direction.

25. The box system of claim 24 wherein said spatial frequency of said plurality of lenslets of said lenticulated section are given by:

$$f_1 = f_0(1 + t/nL_1)$$

wherein $f_1$ is the spatial frequency of said plurality of lenslets, $f_0$ is the spatial frequency of said interlaced preprinted images along said predetermined direction, t is the wall thickness of said lenticulated section, n is the index of refraction of said lenticulated section, and $L_1$ is the viewing distance.

26. A box system for containing recorded media and providing visual information about the contents of the recorded media, said box system comprising:

a pair of opposed, spaced apart flat walls having at least one major dimension;

a plurality of shallow side walls interconnected between said pair of opposed, spaced apart flat walls and having dimensions that are substantially smaller than said major dimension of said pair of opposed, spaced apart flat walls, at least one of said pair of opposed, spaced apart flat walls having at least one transparent lenticulated section having a plurality of lenslets arranged in a two-dimensional array and having a focal plane optically associated therewith, said plurality of shallow side walls and said pair of opposed, spaced apart flat walls providing a multisided flat box with an interior chamber for the recorded media, said pair of opposed, spaced apart flat walls and said plurality of shallow side walls also being interconnected to releasably receive the recorded media; and a compliant insert bearing at least two interlaced preprinted images in the form of an array of two-dimensional image segments, said compliant insert being insertable into said interior chamber and located in a plane substantially parallel to at least one of said pair of opposed, spaced apart flat walls of said flat box and in optical registration with said transparent lenticulated section, said compliant insert being further located substantially in said focal plane of said transparent lenticulated section to provide different information about the recorded media to an observer looking at said transparent lenticulated section from different angular perspectives said plurality of lenslets being arranged on said transparent lenticulated section in progressively offset relationship with respect to one another in two dimensions to compensate for visual parallax effects that would otherwise be apparent to an observer when viewing said transparent lenticulated section from a finite viewing distance.

27. The box system of claim 26 wherein said plurality of lenslets of said lenticulated section have a spatial frequency that is higher than that of said preprinted interlaced images in at least one direction.

28. A box system for containing at least one compact disc, said box system comprising:

a flat base comprising a first flat panel having peripheral edges and shallow raised walls connected around said peripheral edges thereof;

a flat front cover comprising a second flat panel also having peripheral edges and shallow raised walls connected around the peripheral edges thereof, said flat front cover and said flat base being pivotally connected to one another for movement between an open position and a closed position in which they fit together to define an interior chamber therebetween for releasably receiving a compact disc, at least one of said first and second flat panels having a transparent lenticulated section composed of a plurality of lenslets arranged in a two-dimensional array and having a focal plane optically associated therewith;

a removable compliant insert for placement within said interior chamber for providing information that is in a plane substantially parallel to at least one of said first and second flat panels and in optical registration with said transparent lenticulated section thereof, said compliant insert including at least two preprinted interlaced images in the form of an array of two-dimensional image segments located substantially at said focal plane of said transparent lenticulated section to provide different information to an observer looking at said transparent lenticulated section from different angular perspectives, said plurality of lenslets being arranged on said transparent lenticulated section in progressively offset relationship with respect to one another in two dimensions to compensate for visual parallax effects that would otherwise be apparent to an observer when viewing said transparent lenticulated section from a finite distance.

29. The box system of claim 28 wherein said removable compliant insert comprises a multipaneled, printed, sheet which is folded with creases to be resiliently urged against said transparent lenticulated section so that it is substantially flat with respect thereto.

30. The box system of claim 29 wherein said panels of said multifolded sheet are of different lengths so that, when folded, at least one of said panels interferes with the crease formed between two others to create a bow in said insert thereby making it resilient.

31. The box system of claim 29 wherein said panels of said sheet are coated on one side to cause them to curl towards said coated side to provide said removable compliant insert with said resilient characteristics when said panels are folded with their coated sides facing one another.

32. The box system of claim 29 wherein said panels of said multi folded sheet are folded with gentle creases so that when said removable compliant insert is free standing, said gentle creases tend to cause said panels to unfold thereby providing said removable compliant insert with said resilient characteristics.

33. The box system of claim 28 wherein said flat front cover and said flat base are molded of transparent plastic and said transparent lenticulated section is integrally molded with one of said flat panels of said flat front cover and said flat base.

34. The box system of claim 28 wherein said flat front cover and flat base are molded of transparent plastic and said transparent lenticulated section is integrally molded with one of said front cover or said base flat panels thereof.

35. The box system of claim 28 wherein said transparent lenticulated section is formed on the exterior surface of one of said flat front cover and said flat base.

36. The box system of claim 28 wherein said transparent lenticulated section is formed on the interior surface of one said flat front cover and said flat base.

37. The box system of claim 28 further including a compact disc holder adapted to fit between said shallow raised walls of said first flat panel of said flat base.

38. The box system of claim 28 further including a compact disc holder adapt ed to fit between said base flat panel shallow raised walls.

39. The box system of claim 28 wherein said plurality of lenslets of said lenticulated section have a spatial frequency that is higher than that of said preprinted interlaced images in at least one predetermined direction.

40. The box system of claim 39 where in said spatial frequency of said plurality of lenslets of said lenticulated section are given by:

$$f_1 f_0 (1 + t/nL_1)$$

wherein $f_1$ is the spatial frequency of said plurality of lenslets, $f_0$ is the spatial frequency of said preprinted interlaced images in said one predetermined direction, t is the wall thickness of said lenticulated section, n is the index of refraction of said lenticulated section, and $L_1$ is the viewing distance.

41. A box system for containing at least one compact disc, said box system comprising:

a flat base comprising a first flat panel having peripheral edges and shallow raised walls connected to said the peripheral edges thereof;

a flat front cover comprising a second flat panel having peripheral edges and having shallow raised walls connected around the peripheral edges thereof; said flat front cover and said flat base being pivotally connected to one another for movement between an open position and a closed position in which they fit together to define an interior chamber therebetween for releasably receiving a compact disc, one of said first and second flat panels having a transparent lenticulated section optically composed of a plurality of lenslets arranged in a two-dimensional array and having a focal plane associated therewith;

a compliant printed insert for placement in said interior chamber for providing information that is in a plane substantially parallel to and proximate at least one of said front cover and said base and in optical registration with said lenticulated transparent section and said focal plane, said compliant insert having preprinted thereon an array of two-dimensional image segments of at least two interlaced images, said focal plane and said compliant insert being positioned to be in optical registration with respect to one another to provide different information to an observer looking at said transparent lenticulated section from different angular perspectives, said plurality of lenslets being arranged on said transparent lenticulated section in progressively offset relationship with respect to one another in two dimensions to compensate for visual parallax effects that would otherwise be apparent to an observer when viewing said transparent lenticulated section from a finite viewing distance.

42. The box system of claim 41 wherein said plurality of lenslets of said lenticulated section have a spatial frequency that is higher than that of said preprinted interlaced images in at least one predetermined direction.

43. The box system of claim 42 wherein said spatial frequency of said plurality of lenslets of said lenticulated section are given by:

$$f_1 = f_0(1 + t/nL_1)$$

wherein $f_1$ is the spatial frequency of said plurality of lenslets, $f_0$ is the spatial frequency of said preprinted interlaced images in said one predetermined direction, t is the wall thickness of said lenticulated section, n is the index of refraction of said lenticulated section, and $L_1$ is the viewing distance.

44. The box system of claim 41 wherein said transparent lenticulated section comprises substantially all of the surface area of said flat front cover.

45. The box system of claim 41 wherein said different angular perspectives are angularly separated along a vertical plane when said box system is held in a horizontal plane.

46. The box system of claim 41 wherein said different angular perspectives are angularly separated along a horizontal plane when said box system is held in a horizontal plane.

47. The box system of claim 41 including a plurality of transparent lenticular sections in said flat front cover.

48. The box system of claim 41 wherein said plurality of transparent lenticular sections are oriented along different planes.

49. The box system of claim 41 where in said lenslets of said transparent lenticulated section are of different focal length.

50. The box system of claim 41 further including a compact disc holder wherein said compact disc holder and said flat base are complementary configured to snap together.

51. The box system of claim 41 wherein said lenticulated section and compliant insert provide stereo pairs to an observer looking along the same direction at said lenticulated section.

52. A box system for displaying visual information, said box system comprising:
information bearing media of predetermined geometry and thickness, said information bearing media having printed on a surface thereof an array of a plurality of two-dimensional interlaced image segments and having one edge that serves as a reference edge and is in a fixed angular orientation to within a given tolerance with respect to said plurality of two-dimensional interlaced image segments;
a pair of opposed, spaced apart flat walls having at least one major dimension;
a plurality of shallow side walls interconnected between said pair of opposed, spaced apart flat walls and having dimensions that are substantially smaller than said major dimension of said pair of opposed, spaced apart flat walls, at least one of said pair of opposed, spaced apart flat walls having at least one transparent lenticulated section optically associated therewith, said transparent lenticulated section having arranged thereon a plurality of lenslets arranged in a two-dimensional array and that collectively define a focal plane and have a given depth of focus, said plurality of shallow side walls and said pair of opposed, spaced apart flat walls providing an interior chamber for receiving said information bearing means therein; and
means located within said interior chamber for resiliently urging said information bearing means into a position of alignment with respect to said transparent lenticulated section such that said interlaced image segments are located within said depth of focus of said lenslets and said reference edge is in said fixed angular orientation to within a predetermined fraction of the width of one of said lenslets over a predetermined length of said transparent lenticulated section so that an observer of said transparent lenticulated section is provided with distinctly different information when viewing said transparent lenticulated section from different angular perspectives, said plurality of lenslets being arranged in progressively offset relationship with respect to one another on said transparent lenticulated section in two dimensions to compensate for visual parallax effects that would otherwise be apparent to an observer when viewing said transparent lenticulated section from a finite viewing distance.

53. The box system of claim 52 wherein said information bearing means comprises multipaneled, folded, print ed, compliant insert which is resiliently urged against said transparent lenticulated section so that it is substantially flat with respect thereto.

54. The box system of claim 53 wherein said panels of said multi-folded sheet are of different lengths so that, when folded, at least one of said panels interferes with the crease formed between two others to create a bow in said insert thereby making it resilient.

55. The box system of claim 52 wherein one of the panels of said multipaneled, fold ed, compliant insert contains said reference edge and the edges of the other panels thereof are tapered with respect to said reference edge so that, when folded, only said reference edge is available for angular alignment purposes on one side of said compliant insert.

56. The box system of claim 52 wherein said box system is molded of transparent plastic and said transparent lenticulated section is integrally molded with at least one of said opposed walls thereof.

57. The box system of claim 52 one wherein said transparent lenticulated section is formed on the exterior surface of one of said opposed flat walls.

58. A box system for containing at least one compact disc, said box system comprising:
a flat base comprising a first flat panel having shallow raised walls connected around the peripheral edges thereof;
a flat front cover comprising a second flat panel also having shallow raised walls connected around the peripheral edges thereof, said flat front cover and said flat base being pivotally connected to one another to form a hinge between them so that they can be moved between a closed position in which they fit together to define an interior chamber therebetween for releasably receiving a compact disc, at least one of said first and second flat panels having a transparent lenticulated section having a plurality of lenslets arranged in a two-dimensional array optically associated therewith and having a focal plane and a given depth of focus;
information bearing media of predetermined geometry and thickness, said information bearing having printed on a surface thereof a plurality of interlaced images in the form of an array of two-dimensional image segments and having one edge that serves as a reference edge and to within a given tolerance in a given angular orientation with respect to said interlaced images, said information bearing media being insertable into said interior chamber for providing information when it is in a plane substantially parallel to at least one of said first and second flat panels and in optical registration with said transparent lenticulated section thereof; and means located within said interior chamber for resiliently urging said information bearing means into a position of alignment with respect to said transparent lenticulated section such that said interlaced images are located within the depth of focus of said lenslets and said reference edge is in said given angular orientation, within a predetermined fraction of the width of one of said lenslets over the length of said interlaced images so that an observer of said transparent lenticulated section is provided with distinctly different information when viewing said transparent lenticulated section from different angular perspectives said plurality lenslets being arranged on said transparent lenticulated section in progressively offset relationship with respect to one another in two dimensions to compensate for visual parallax effects that would otherwise be apparent to an observer when viewing said transparent lenticulated section from a finite viewing distance.

59. The box system of claim 58 further including a tray for holding a compact disc inside of said interior chamber, said tray and said base including complementary configured means for snap fitting together, said tray including flexible sections for resiliently urging said information bearing media into alignment with said focal plane.

60. The box system of claim 58 wherein said shallow walls of said front cover include flexible clips for holding said information bearing media and resiliently urging it into alignment with said focal plane.

61. The box system of claim 58 wherein said one of said shallow walls of said front cover include a pair of reference bosses for defining a reference line therebetween and an oppositely facing shallow wall includes flexible arms for resiliently urging said reference edge of said information bearing media against said reference line to angularly align said interlaced images with respect to the axes of said lenslets.

62. The box system of claim 58 wherein said different angular perspectives are angularly separated along a vertical plane when said lenslets of said transparent lenticulated section are oriented in a horizontal plane.

63. The box system of claim 58 wherein said information bearing media bears at least one stereo pair image and said transparent lenticulated section operates to provide stereo pairs to an observer looking along the same direction at said lenticulated section.

64. A box system for use with information bearing media of predetermined geometry and thickness to display visual information where the information bearing media has printed on a surface thereof a plurality of interlaced images, one edge that serves as a reference edge, and a given angular orientation to within a given tolerance with respect to the interlaced images, said box system comprising:

at least one flat wall having at least one major dimension, said flat wall having at least one transparent lenticulated section optically associated therewith, said transparent lenticulated section having arranged thereon a plurality of lenslets arranged in a two-dimensional array and whose foci collectively substantially reside in a focal plane and have a given depth of focus;

a plurality of shallow side walls connected with said flat wall and having dimensions that are substantially smaller than said major dimension of said flat wall; and means for releasably holding said information bearing media with respect to said flat wall and at least one of said shallow side walls so that said information bearing media is located in a position of alignment with respect to said transparent lenticulated section such that said interlaced images are located within said depth of focus of said lenslets and said reference edge is in said fixed angular orientation, within a predetermined fraction of the width of one of said lenslets over a predetermined length of said interlaced images so that an observer of said transparent lenticulated section is provided with distinctly different information when viewing said transparent lenticulated section from different angular perspectives, said lenslets being arranged on said transparent lenticulated section in progressively offset relationship with respect to one another in two dimensions to compensate for visual parallax effects that would otherwise be apparent to an observer.

65. The box system of claim 64 wherein said holding means comprises flexible sections for resiliently urging said information bearing media into alignment with respect to said transparent lenticulated section.

66. The box system of claim 64 wherein said holding means comprises a pair of spaced apart channel sections dimensioned with respect to said predetermined geometry and thickness of said information bearing media to provide a snug fit therewith for purposes of aligning said interlaced images with respect to said transparent lenticulated section.

67. The box system of claim 64 further including another flat wall opposed so said one flat wall and in combination with said shallow side walls defining a slot therebetween for receiving said information bearing media, said slot being dimensioned with respect to said predetermined geometry and thickness of said information bearing media to provide a snug fit therewith for purposes of aligning said interlaced images with respect to said transparent lenticulated section.

68. The box system of claim 67 wherein both of said flat walls include lenticulated sections and said information bearing media comprises printed interlaced images on opposed surfaces thereof for providing different views on both sides of said box system.

69. The box system of claim 67 wherein said lenticulated section is comprised of portions having different angular orientations with respect to said interlaced images.

70. The box system of claim 64 wherein said lenticulated section and the interlaced images of said information bearing media have portions that are at different spatial frequencies with respect to other portions.

71. The box system of claim 64 wherein all of the walls of said box system are molded of transparent plastic and said lenslets are formed on a front surface thereof.

\* \* \* \* \*